United States Patent
Yamamoto et al.

(10) Patent No.: US 8,568,925 B2
(45) Date of Patent: Oct. 29, 2013

(54) LITHIUM SECONDARY BATTERY

(75) Inventors: Taisuke Yamamoto, Nara (JP);
Hideharu Takezawa, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/502,996

(22) PCT Filed: May 12, 2011

(86) PCT No.: PCT/JP2011/002648

§ 371 (c)(1),
(2), (4) Date: Apr. 19, 2012

(87) PCT Pub. No.: WO2011/145301

PCT Pub. Date: Nov. 24, 2011

(65) Prior Publication Data

US 2012/0208087 A1  Aug. 16, 2012

(30) Foreign Application Priority Data

May 18, 2010  (JP) ................................ 2010-114657

(51) Int. Cl.
*H01M 4/485* (2010.01)

(52) U.S. Cl.
USPC ..................................... 429/231.95; 429/233

(58) Field of Classification Search
USPC ........................ 429/231.95, 223, 233, 231.8
See application file for complete search history.

(56) References Cited

U.S. PATENT DOCUMENTS

| | | | |
|---|---|---|---|
| 6,207,325 B1 * | 3/2001 | Matsui et al. | 429/231.1 |
| 6,455,199 B1 * | 9/2002 | Kitagawa et al. | 429/231.8 |
| 2002/0061445 A1 | 5/2002 | Kitagawa et al. | |
| 2007/0059587 A1 * | 3/2007 | Kishi et al. | 429/62 |
| 2008/0118837 A1 * | 5/2008 | Shirane et al. | 429/221 |

FOREIGN PATENT DOCUMENTS

| | | |
|---|---|---|
| JP | 08-213015 A | 8/1996 |
| JP | 11-045715 A | 2/1999 |
| JP | 11-054123 A | 2/1999 |
| JP | 2003-142075 A | 5/2003 |
| JP | 2006-294482 A | 10/2006 |
| JP | 2008-226643 A | 9/2008 |

OTHER PUBLICATIONS

Yamada et al. (1995). Synthesis and properties of LiNiO$_2$ as cathode material for secondary batteries. *J Power Sources*, 54(2), 209-213.
International Search Report issued in International Patent Application No. PCT/JP2011/002648, dated Aug. 23, 2011.

\* cited by examiner

*Primary Examiner* — Mark F Huff
*Assistant Examiner* — Monique Wills
(74) *Attorney, Agent, or Firm* — McDermott Will & Emery LLP

(57) ABSTRACT

A lithium secondary battery according to the present invention includes: a positive electrode having a positive-electrode active material capable of occluding and releasing lithium ions; a negative electrode having a negative-electrode active material capable of occluding and releasing lithium ions; a separator interposed between the positive electrode and the negative electrode; and an electrolyte having lithium-ion conductivity. The positive-electrode active material contains a nickel-type lithium-containing complex oxide. The negative-electrode active material contains a graphite-type material having a reversible capacity of 350 mAh/g or more and an irreversible capacity of 30 mAh/g or less. A ratio Qc/Qa between an irreversible capacity Qc per unit area in a portion of the positive electrode that opposes the negative electrode and an irreversible capacity Qa per unit area in a portion of the negative electrode that opposes the positive electrode is equal to or greater than 0.50 but less than 1. As a result, the charge-discharge cycle characteristics can be improved while ensuring a high capacity.

12 Claims, 6 Drawing Sheets

LITHIUM SECONDARY BATTERY

RELATED APPLICATIONS

This application is the U.S. National Phase under 35 U.S.C. §371 of International Application No. PCT/JP2011/002648, filed on May 12, 2011, which in turn claims the benefit of Japanese Application No. 2010-114657, filed on May 18, 2010, the disclosures of which Applications are incorporated by reference herein.

TECHNICAL FIELD

The present invention relates to a lithium secondary battery whose positive-electrode active material contains a nickel-type lithium-containing complex oxide.

BACKGROUND ART

Lithium secondary batteries have a high capacity and a high energy density, and are easy to be reduced in size and weight, and therefore are widely used as power supplies for small-sized electronic devices for mobile use, e.g., mobile phones, personal digital assistants (PDAs), laptop personal computers, camcorders, and portable game machines, for example. Although small-sized electronic devices for mobile use are required to attain multiple functions, they are yet expected to overcome the cumbersomeness of battery exchange and achieve an enhanced device design. Therefore, there are increasing needs for structures in which a lithium secondary battery(s) is internalized within the device (lithium battery internalization). Moreover, lithium secondary batteries are expected not only as promising power supplies for small-sized electronic devices, but also as promising power supplies for large-sized devices, e.g., hybrid cars, electric vehicles, and power tools.

For adaptability in such applications, a higher capacity, and an improved durability and reliability, e.g., cycle life, are desired of lithium secondary batteries.

In order to attain a further increase in the capacity of lithium secondary batteries, development of positive-electrode active materials is under way. As the positive-electrode active materials, lithium-containing complex oxides are known, such as lithium cobalt oxide ($LiCoO_2$) and lithium nickel oxide ($LiNiO_2$) having a layer structure, lithium manganese spinel ($LiMn_2O_4$) having a spinel structure, and so on.

Among others, lithium nickel oxides such as $LiNiO_2$ have a high reversible capacity (180 to 200 mAh/g) in a voltage range that is used for $LiCoO_2$, and is capable of occluding and releasing larger amounts of lithium. Therefore, by using $LiNiO_2$, lithium secondary batteries can be further increased in capacity, while minimizing side reactions such as decomposition of the electrolyte solution.

However, as compared to $LiCoO_2$, there is a problem associated with $LiNiO_2$: that is, a low operating potential of lithium occlusion and release. A low operating potential makes it difficult for the energy density of a lithium secondary battery to be further increased. Moreover, the poor stability of the crystal structure of $LiNiO_2$ also presents a problem of a short charge/discharge cycle life. Furthermore, generally speaking, nickel-type lithium-containing complex oxides have an irreversible capacity which basically makes them unusable at room temperature. Therefore, there also exists a problem in that, when a battery is constructed by using a nickel-type lithium-containing complex oxide as the positive-electrode active material, an initial capacity of the battery is undermined.

Regarding the problem of the low operating potential, Patent Document 1 proposes a technique of using a mixture of a lithium nickel oxide with a lithium cobalt oxide, and carrying out a charging with a voltage which is higher than conventional.

Regarding the problem of a short cycle life, Patent Document 2 proposes using a positive-electrode active material in which a portion of the Ni in $LiNiO_2$ is substituted by another element such as cobalt (Co) or aluminum (Al), in order to stabilize the crystal structure of the lithium nickel oxide. Non-Patent Document 1 proposes, in a lithium secondary battery whose positive-electrode active material is $LiNiO_2$, carrying out charge/discharge while limiting the amounts of lithium occlusion and release with respect to $LiNiO_2$. Specifically, it is stated that, when the lithium nickel oxide is expressed as $Li_{1-y}NiO_2$, the charge transfer resistance can be lowered by carrying out charge/discharge in a range such that y values are $0.15 < y < 0.75$.

Patent Document 3 discloses a technique of prescribing an appropriate irreversible capacity (to be no less than 39 mAh/g and no more than 61 mAh/g) for the negative electrode so as to counteract the capacity losses associated with the irreversible capacity of a nickel-type lithium-containing complex oxide, thus minimizing the decrease in battery capacity.

CITATION LIST

Patent Literature

[Patent Document 1] Japanese Laid-Open Patent Publication No. 2006-294482
[Patent Document 2] Japanese Laid-Open Patent Publication No. 8-213015
[Patent Document 3] Japanese Laid-Open Patent Publication No. 2008-226643

Non-Patent Literature

[Non-Patent Document 1] Journal of Power Sources 54 (1995) 209-213

SUMMARY OF INVENTION

Technical Problem

Even with the aforementioned conventional secondary batteries, it is difficult to reconcile an increased capacity and a long life.

With the technique proposed in Patent Document 1, it is possible to increase the operating potential of the lithium secondary battery, and improve the charge-discharge cycle characteristics up to 100 cycles. However, in order to meet the needs mentioned above, it is necessary to further improve the charge-discharge cycle characteristics. On the other hand, using the positive-electrode active material which is proposed in Patent Document 2 will provide improved charge-discharge cycle characteristics. However, due to a low operating potential, it is difficult to obtain a sufficiently enhanced capacity. On the other hand, decreasing the amount of lithium that is occluded or released by the positive-electrode active material as proposed in Non-Patent Document 1 will provide some effect of improving reversibility, but capacity increases and long-term improvements in cycle life cannot be attained.

According to the technique disclosed in Patent Document 3, capacity losses associated with the irreversible capacity of the positive electrode can be reduced. Moreover, since it employs a material which is obtained by subjecting coke to a heat treatment for a negative electrode having an irreversible capacity in the aforementioned range, a sufficient capacity can be obtained. However, a high charge/discharge potential of the negative electrode presents a problem of lowering the operating potential of the battery, thus making it impossible to obtain a high energy density.

The present invention has been made in view of the above circumstances, and an objective thereof is to improve the charge-discharge cycle characteristics of a lithium secondary battery while ensuring a high capacity.

Solution to Problem

A lithium secondary battery according to the present invention comprises: a positive electrode having a positive-electrode active material capable of occluding and releasing lithium ions, a negative electrode having a negative-electrode active material capable of occluding and releasing lithium ions, a separator interposed between the positive electrode and the negative electrode, and an electrolyte having lithium-ion conductivity, wherein, the positive-electrode active material contains a nickel-type lithium-containing complex oxide; the negative-electrode active material contains a graphite-type material having a reversible capacity of 350 mAh/g or more and an irreversible capacity of 30 mAh/g or less; and a ratio Qc/Qa between an irreversible capacity Qc per unit area in a portion of the positive electrode that opposes the negative electrode and an irreversible capacity Qa per unit area in a portion of the negative electrode that opposes the positive electrode is equal to or greater than 0.50 but less than 1.13.

In a preferred embodiment, a ratio Wc/Wa between a weight Wc per unit area of the positive-electrode active material in the portion of the positive electrode that opposes the negative electrode and a weight Wa per unit area of the negative-electrode active material in the portion of the negative electrode that opposes the positive electrode is greater than 0.95 but less than 2.25.

In a preferred embodiment, the nickel-type lithium-containing complex oxide has a composition expressed as $Li_aNi_{1-(b+c)}Co_bM_cO_2$ (where 1.0≤a≤1.05; 0.1≤b≤0.35; 0.005≤c≤0.30; and M is at least one kind selected from Al, Sr, and Ca).

In a preferred embodiment, the lithium secondary battery has a discharge end voltage of no less than 2.5 V and no more than 3.0 V; and a discharge end potential of the positive electrode is no less than 2.7 V and no more than 3.4 V on a lithium metal basis.

In a preferred embodiment, the lithium secondary battery has a charge end voltage of no less than 4.2 V and no more than 4.3 V; and the positive electrode has a charge end potential of no less than 4.3 V and no more than 4.4 V on a lithium metal basis.

In a preferred embodiment, the negative-electrode active material contains lithium titanate. A ratio Wg/Wt of a weight Wt of lithium titanate to a weight Wg of the graphite-type material in the negative-electrode active material may be no less than 3 and no more than 100.

In a preferred embodiment, the ratio Qc/Qa is greater than 0.75.

An electronic device according to the present invention comprises the above lithium secondary battery.

A vehicle according to the present invention comprises the above lithium secondary battery.

A battery pack according to the present invention comprises the above lithium secondary battery.

A battery module according to the present invention comprises the above lithium secondary battery.

Advantageous Effects of Invention

According to the present invention, in a lithium secondary battery in which a nickel-type lithium-containing complex oxide is used as the positive-electrode active material, a ratio of irreversible capacities of the positive electrode and the negative electrode is set in a specific range, whereby the discharge end potential of the positive electrode can be increased while suppressing decreases in capacity. As a result, the charge-discharge cycle characteristics can be improved while suppressing decreases in reversible capacity.

Preferably, the discharge end potential of the positive electrode is controlled to no less than 2.7 V and no more than 3.4 V on a lithium metal basis. By ensuring that the discharge end potential of the positive electrode is no less than 2.7 V on a lithium metal basis, changes in the crystal structure of the positive-electrode active material due to charge/discharge can be suppressed. Moreover, since increases in reaction resistance due to denaturing of the positive-electrode active material surface can be reduced, deterioration of the positive electrode through repetitions of charge/discharge can be suppressed. On the other hand, by ensuring that the discharge end potential of the positive electrode is no more than 3.4 V, decreases in reversible capacity are suppressed and a sufficient capacity can be ensured.

DESCRIPTION OF EMBODIMENTS

The inventors have earnestly conducted studies concerning a charge/discharge method for reconciling high capacity and charge/discharge reversibility, by using a lithium-containing complex oxide as a positive-electrode active material. In doing so, it was found that the potential region of use of a positive-electrode active material, in particular at the discharge side, is greatly related to charge/discharge reversibility. Specifically, it was found that, in a charge/discharge context, charge/discharge reversibility is strongly correlated not only to the amount of lithium occluded or released by the positive-electrode active material, but also to a discharge end potential as taken on a lithium metal basis. It was further found that changes in the discharge potential of the negative electrode can be utilized for controlling the potential region of use of the positive electrode.

Hereinafter, the results of the study by the inventors will be described in detail.

<A Study Concerning the Relationship Between the Discharge End Potential of the Positive Electrode and Deterioration of the Positive Electrode>

Figure 9:
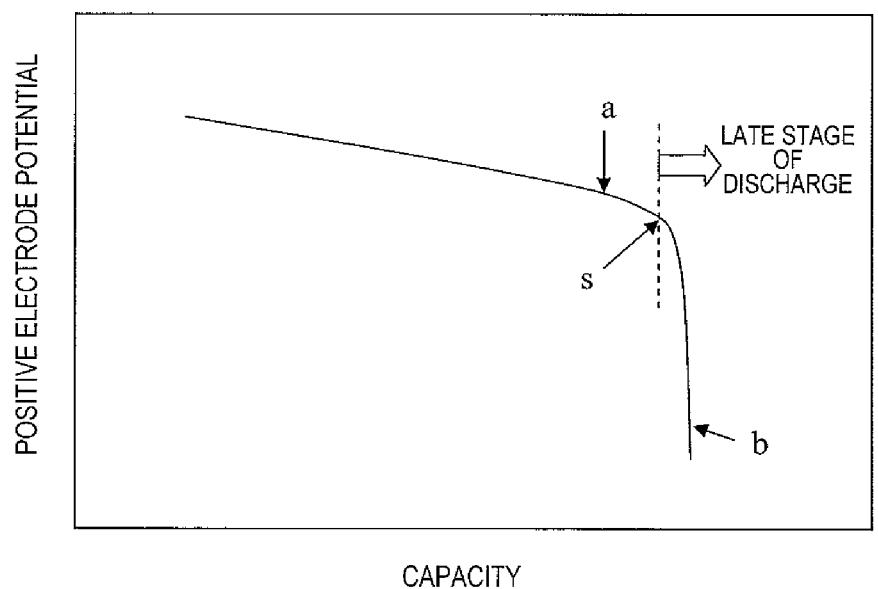
FIG. 9 A graph illustrating an example discharge curve of a positive-electrode active material.

FIG. 9 is a graph illustrating an exemplary discharge curve of a positive-electrode active material of a lithium secondary battery, where the horizontal axis represents capacity and the vertical axis represents the potential of the positive-electrode active material. As shown in the figure, in a late stage of discharge, polarization increases due to the slowing of an occlusion reaction of lithium into the positive-electrode active material, whereby the discharge potential becomes greatly lowered. On the other hand, changes in capacity are very small in the late stage of discharge.

Through a study of the inventors, it was found that deterioration of the positive-electrode active material occurs if discharge is performed until the discharge potential becomes low (e.g., until reaching potential b) in the late stage of discharge. This is presumably because of changes in the crystal structure of the lithium-containing complex oxide (e.g., $Li_xNi_{1-(b+c)}Co_bM_cO_2$) which is the positive-electrode active material. In a positive-electrode active material layer that contains a lithium-containing complex oxide, a new crystal phase with low reversibility may possibly occur even in the late stage of discharge if the amount of lithium x locally exceeds 1 ($x>1$). The presumable reason is that in a region defined by a slow occlusion reaction of lithium at the positive electrode, a reaction distribution is likely to emerge in the interior of the active material, so that the surface attains a deeper discharging state. It has also been found, as a result of this, that the active material surface becomes denatured through repetition of charge/discharge cycles, thus promoting the increase in the reaction resistance.

If an excessively high discharge end potential is set (e.g., potential a), the discharge will stop before reaching the late stage of discharge, at which the discharge potential drops in the discharge curve shown in FIG. 9. This prevents a sufficient capacity from being set. Moreover, if the discharge is ended at any point before reaching potential a, as the polarization increases with an increase in internal resistance over the cycles, the end voltage timing of the battery will become extremely early due to the potential changes being gentle, thus resulting in a significant decrease in capacity. In order to reduce the decrease in capacity, the discharge end potential needs to be set at or below the potential of a point at which the discharge potential drops (e.g., potential s).

Based on the above findings, the inventors have found that, by controlling the discharge end potential of the positive-electrode active material to be within a specific potential range, the charge/discharge reversibility (charge-discharge cycle characteristics) can be remarkably improved relative to the conventional level, while minimizing decreases in the reversible capacity.

Next, the results of the study by the inventors will be described in more detail.

First, with reference to the drawings, the discharge characteristics in the case where a nickel-type lithium-containing complex oxide is used as a positive-electrode active material will be described.

Figure 1:
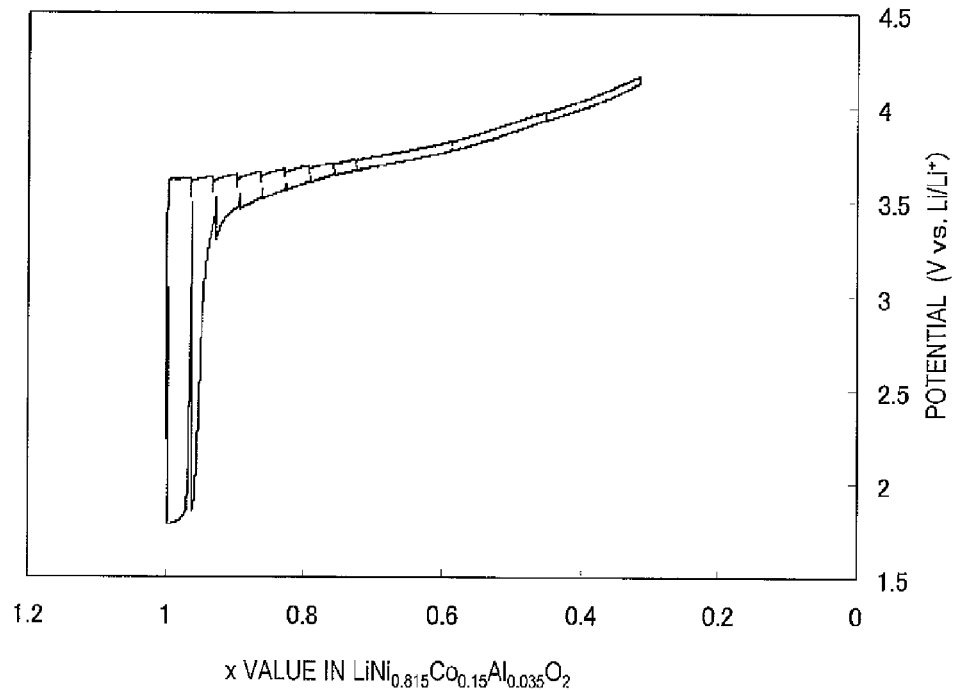
FIG. 1 A graph showing charge/discharge potential behavior of a nickel-type lithium-containing complex oxide.

FIG. 1 is a graph showing typical charge/discharge potential behavior of a nickel-type lithium-containing complex oxide (25° C.). The graph shown in FIG. 1 shows a result of measuring potential changes when $LixNi_{0.815}Co_{0.15}Al_{0.035}O_2$ was used as the nickel-type lithium-containing complex oxide, where the x value was varied in the range of $0.3 \leq x \leq 1.0$.

In the measurement, the aforementioned nickel-type lithium-containing complex oxide was intermittently charged or discharged with a current density of 0.3 mA/cm². During the charge/discharge, the current was paused at a constant interval to measure open-circuit potentials. Each pause time was 1 hour. By consecutively repeating current application and pausing, the potential behavior with respect to the x value was plotted in FIG. 1. In the graph shown in FIG. 1, spike-shaped potential changes occur at a number of x values. These are the changes when the charge/discharge was paused at those x values, each indicating an open-circuit potential at that point.

As these results indicate, in the range where the x value is equal to or greater than 0.3 but less than 0.8, the difference between the closed-circuit potential and the open-circuit potential during charging and discharge is small. However, when the x value is equal to or greater than 0.8, the difference between the closed-circuit potential and the open-circuit potential during discharge gradually increases, and soars when the x value becomes greater than about 0.9, for example. This is presumably because of the slow lithium occlusion by the positive-electrode active material appearing as polarization. It was learned through a crystallography based on X-ray diffraction that a portion of the crystal structure of the positive-electrode active material when lithium is occluded through a complete discharge down to $x=1.0$ changes into a structure which is different from the crystal structure of the positive-electrode active material before the charge/discharge.

The details of the relationship between the phenomenon described with reference to FIG. 1 and the charge/discharge reversibility are not yet clear. The inventors' inference is that, when a region with a large reaction resistance that exists in the late stage of discharge is repetitively used, at least a portion of the positive-electrode active material gradually denatures into a crystal phase with low reversibility, thus resulting in an increase in the reaction resistance over the charge/discharge cycles.

Based on the above inference, stopping the discharge before the reaction resistance soars might improve the charge/discharge reversibility, when conducting a discharge at the positive electrode. However, if the time of stopping discharge is set so early that the discharge is stopped e.g., before reaching the late stage of discharge (that is, before the changes in the discharge potential soars), the capacity will be lowered. Therefore, in order to improve the charge/discharge reversibility while conserving the capacity, it is necessary to control the time of stopping discharge.

On the other hand, the inventors have conducted a further study to find that increasing the ambient temperature (e.g. 45° C.) or extremely lowering the current density (e.g. 0.06 mA/cm²) will reduce the polarization in the region where the x value is 0.8 or more, thus increasing the available capacity at a high discharge end potential. In other words, although the graph shown in FIG. 1 shows that the point of sudden increase in the polarization has an x value near 0.9 and the point of sudden increase in the potential change has an x value near 0.8 during discharge, these x values may change with different ambient temperatures, current densities, and so on. Hereinafter, this will be explained with reference to specific examples.

Figure 2:
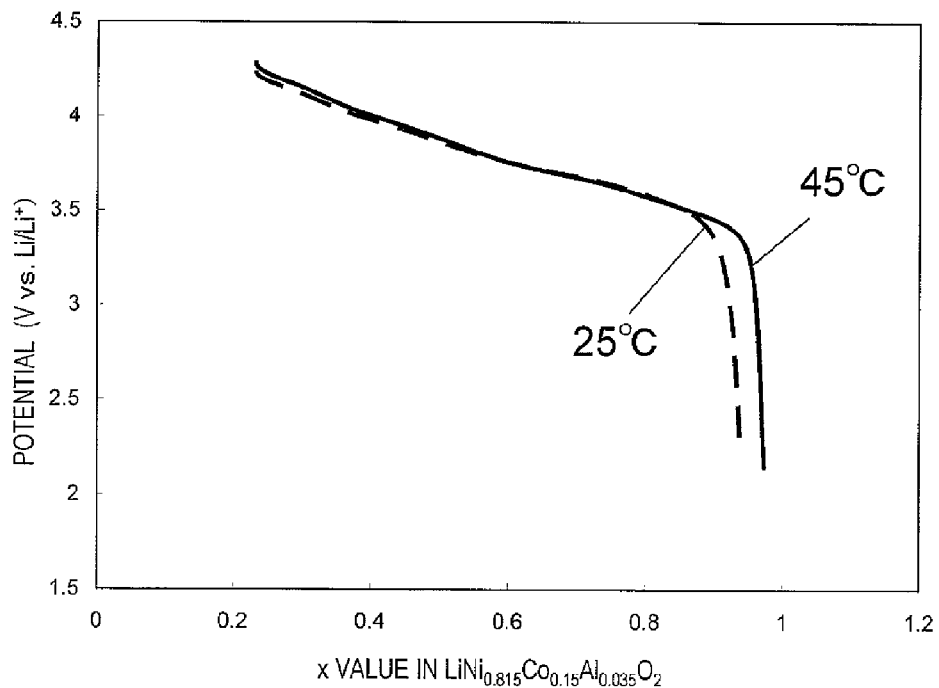
FIG. 2 A graph showing a discharge curve of a nickel-type lithium-containing complex oxide.

FIG. 2 is a graph showing a discharge potential curve of a positive electrode whose positive-electrode active material is a nickel-type lithium-containing complex oxide. Herein, $LiNi_{0.815}Co_{0.15}Al_{0.035}O_2$ was used, and a discharge potential curve was determined by setting a current density of 3.0 mA/cm², a charge end potential of 4.25 V, and a discharge end potential of 2.0 V. The ambient temperature was 25° C. or 45° C.

As the results shown in FIG. 2 indicate, the discharge potential hardly changes with temperature until the x value reaches 0.8. As the x value exceeds 0.8, the potential change suddenly increases at the ambient temperature of 25° C., but the potential change is small at the ambient temperature of 45° C. Moreover, at the ambient temperature of 25° C., the polarization increases when the x value exceeds e.g. 0.9; however, at the ambient temperature of 45° C., the polarization remains small even when the x value exceeds 0.9, but the polarization increases after the x value exceeds 0.95. At the ambient temperature of 45° C., the capacity is increased by about 6% from that when the ambient temperature is 25° C.

Thus, during discharge, the x value of the point of sudden increase in the potential change and the x value of the point of sudden increase in the polarization may vary depending on the ambient temperature. This makes it difficult to determine a time of stopping discharge on the basis of the x value (i.e., the amount of lithium that is occluded by the positive-electrode active material). For example, if control is so made that the discharge is stopped at a point where the x value reaches 0.9, a high capacity will be obtained with an ambient temperature of 45° C., but the capacity may be lowered with an ambient temperature of 25° C. On the other hand, if control is so made that the discharge is stopped at a point where the x value reaches 0.95, deterioration of the positive electrode can be suppressed with an ambient temperature of 45° C., but deterioration of the positive electrode cannot be suppressed with an ambient temperature of 25° C.

Conversely, the potential of the positive electrode at a point where a sudden increase occurs in the potential change or in the polarization during discharge will not vary depending on the ambient temperature or the like. Therefore, by controlling the time of stopping discharge on the basis of the potential of the positive electrode, it becomes possible to suppress deterioration of the positive electrode and improve reversibility while maintaining a high capacity, irrespective of the ambient temperature and current density.

Specifically, as shown in FIG. 2, regardless of the ambient temperature, the potential change suddenly increases and the changes in reversible capacity become small when the discharge potential of the positive electrode is about 3.4 V. Therefore, if discharge is stopped before the discharge potential of the positive electrode reaches 3.4 V, the charge/discharge reversibility will be improved, but the reversible capacity will be greatly lowered. Moreover, when the internal resistance increases over the charge/discharge cycles, decreases in capacity due to increasing polarization will appear more significantly because of the potential changes being gentle. On the other hand, irrespective of the ambient temperature, when the discharge potential of the positive electrode is lower than 2.7 V, the polarization increases and the reaction resistance increases. Therefore, if discharge is performed until the discharge potential of the positive electrode becomes less than 2.7 V, a high reversible capacity will be obtained, but the charge/discharge reversibility will be greatly lowered. Accordingly, by stopping discharge while the discharge potential of the positive electrode is no less than 2.7 V and no more than 3.4 V, both reversible capacity and charge/discharge reversibility can be reconciled.

In a conventional lithium secondary battery in which lithium cobalt oxide is used as the positive-electrode active material and graphite is used as the negative-electrode active material, generally speaking, discharge is stopped at a point where the potential of the positive electrode drops (point of potential b shown in FIG. 9), in order to maximize the reversible capacity of the positive electrode. The point at which to stop discharge is determined based on the lowest voltage of the device, the potential change in the material for each active material itself, and the amounts of the materials for the active materials of the positive electrode and negative electrode (capacity). Therefore, there has never existed a concept of stopping discharge by controlling the discharge potential of the positive electrode to a predetermined potential (discharge end potential). Moreover, the correlation between the potential region of use of the positive electrode at the discharge side and deterioration of the positive electrode (decrease in the charge/discharge reversibility), which exists in the case of using a nickel-type lithium-containing complex oxide as the positive-electrode active material, has never been recognized. For example, Patent Document 3 presents an analysis that the factor for the charge-discharge cycle characteristics is a deterioration of the negative electrode that is induced by a potential shift of the negative electrode near the discharge end. There is no mention of the relationship between the potential region of use of the positive electrode and deterioration of the positive electrode.

<A Study Deterioration Caused by Charging at the Positive Electrode>

A decrease in the battery capacity can be prevented by not only increasing the discharge end potential of the positive-electrode active material to 2.7 V or more, but also increasing the charge end potential of the positive electrode so as to shift the potential range of use of the positive electrode toward higher potentials. However, there is a possibility that increasing the charging potential from the conventional level may induce deterioration.

Therefore, the inventors have also studied in depth the deterioration that may occur when the charge end potential of the positive-electrode active material (nickel-type lithium-containing complex oxide) is increased.

According a study by the inventors, if the charging potential becomes too high when charging the positive-electrode active material, the crystal structure of the positive-electrode active material becomes unstable due to desorption of lithium from the positive-electrode active material. Therefore, a phase with a low Ni valence (e.g. NiO) is formed near the surface of the positive-electrode active material, thereby increasing polarization. Thus, it has been found that the mechanism of a deterioration occurring on the charging side is different from the mechanism of a deterioration occurring on the discharge side, which was described above with reference to FIG. 1 (i.e., a deterioration which occurs when the discharge end potential is decreased). Furthermore, it has been found that the deterioration occurring on the charging side exerts less influence on capacity than does the deterioration occurring on the discharge side. In other words, a decrease in capacity due to deterioration on the charging side would be smaller than a decrease in capacity due to a deterioration on the discharge side.

It has thus been found that, by appropriately shifting the potential range of use of the positive electrode toward the higher potential region from what is conventional, the charge/discharge cycle life can be improved while effectively suppressing decreases in reversible capacity, and preferably with no decrease in the reversible capacity.

<A Study Concerning Control of the Discharge End Potential of the Positive Electrode>

Next, the inventors conducted studies concerning means with which to control the discharge end potential of the positive electrode so as to be within the aforementioned range. As a result, they have found that it is possible to control the discharge end potential of the positive electrode by optimizing the ratio between the irreversible capacities of the positive-electrode active material and the negative-electrode active material.

As the negative-electrode active material, a graphite material, which has a large reversible capacity and whose irreversible capacity has a small rate with respect to its reversible capacity, is used. By setting a rate between an irreversible capacity Qa per unit area of this graphite material and an irreversible capacity Qc per unit area of a nickel-type lithium-containing complex oxide which is the positive-electrode active material to be in a specific range, it is possible to stop discharge on the basis of a potential increase of the negative electrode in the late stage of discharge. As a result of this, a decrease in the discharge potential of the positive electrode can be reduced. Therefore, by balancing out the irreversible capacity of the positive electrode with the irreversible capacity of the negative electrode, decreases in reversible capacity can be reduced, while also improving the charge/discharge cycle life over the conventional level.

First Embodiment

Hereinafter, a lithium secondary battery according to a first embodiment of the present invention will be described.

A lithium secondary battery according to the present embodiment includes a positive electrode containing a positive-electrode active material, a negative electrode containing a negative-electrode active material capable of occluding and releasing lithium, a separator disposed between the positive electrode and the negative electrode, and a nonaqueous electrolyte.

The positive-electrode active material in the present embodiment is a nickel-type lithium-containing complex oxide capable of occluding and releasing lithium. The nickel-type lithium-containing complex oxide may be an $LiNiO_2$-based material in which a portion of the Ni is substituted by another element selected from the group consisting of Mg, Sc, Y, Mn, Fe, Co, Ni, Cu, Zn, Al, Cr, Pb, Sb, and B.

As the negative-electrode active material in the present embodiment, a graphite-type material having a reversible capacity of 350 mAh/g or more and an irreversible capacity of 30 mAh/g or less is used. By using such a graphite-type material, a greater reversible capacity can be obtained at a charge/discharge potential which is close to the Li metal potential. The graphite-type material may be an artificial graphite or natural graphite, or a mixture of such graphites. It is particularly desirable to use a highly crystalline graphite material whose lattice planes (002) have an interplanar spacing ($d_{002}$) of 3.350 to 3.400 Å. The graphite material may have been processed into sphere, flake, or chunk shapes. Graphites with different particle sizes may be mixed for an increased packing density.

In the present embodiment, a ratio Qc/Qa between an irreversible capacity Qa of the negative electrode and an irreversible capacity Qc of the positive electrode is equal to or greater than 0.5 but less than 1.13 ($0.5 \leq Qc/Qa < 1.13$). As used herein, the irreversible capacity ratio Qc/Qa refers to a rate of irreversible capacity per unit area in a portion where the positive electrode and the negative electrode are opposing each other. The "opposing portion" refers to a portion where the positive electrode and the negative electrode overlap in an electrode group in which a separator is interposed between the positive electrode and the negative electrode (that is, in the case of a wound-type, before being wound) as seen from the normal direction of the electrode group.

By setting the irreversible capacity ratio Qc/Qa to less than 1.13, as will be described in detail later, the discharge potential of the positive electrode when stopping discharge can be made greater than conventional. As a result, deterioration in the charge/discharge cycle life due to deterioration of the positive electrode can be suppressed. Moreover, by setting the irreversible capacity ratio Qc/Qa to be equal to or greater than 0.50, discharge can be stopped in a region in a late stage of discharge at the positive electrode where the capacity changes are small, whereby a high capacity can be ensured. Preferably, the irreversible capacity ratio Qc/Qa is set to more than 0.75. As a result, a desired capacity can be ensured with greater certainty.

Preferably, by setting the irreversible capacity ratio Qc/Qa so as to be within the aforementioned range, the discharge end potential of the positive electrode when stopping discharge is controlled to be no less than 2.7 V and no more than 3.4 V based on lithium. By keeping the discharge potential of the positive electrode to equal to or less than 3.4 V, which is the potential at which the discharge potential has a large decrease in the late stage of discharge, the decrease in capacity can be minimized. On the other hand, by controlling the discharge end potential to be 2.7 V or more, deterioration of the positive-electrode active material through repetitions of charge/discharge can be suppressed. As a result, it becomes possible to improve the charge-discharge cycle characteristics while ensuring a sufficient capacity.

Now, the charge/discharge behavior of a lithium secondary battery in which a graphite-type material is used as the negative-electrode active material and a nickel-type lithium-containing complex oxide is used as the positive-electrode active material will be described.

In a conventional lithium secondary battery, in order to maximize the reversible capacity of the positive electrode, discharge of the battery is stopped by relying on drastic potential changes in the positive electrode. A potential control which stops discharge based on a drop in the discharge potential of the positive electrode as such is referred to as "restriction by positive electrode potential". In order to achieve restriction by positive electrode potential, the irreversible capacity Qc of the positive electrode is set sufficiently larger than the irreversible capacity Qa of the negative electrode. Therefore, before the discharge potential of the negative electrode begins to soar (i.e., within the region where the potential changes of the negative electrode are gentle), the discharge potential Vc of the positive electrode drops, thus causing the discharge to be stopped.

Figure 3:
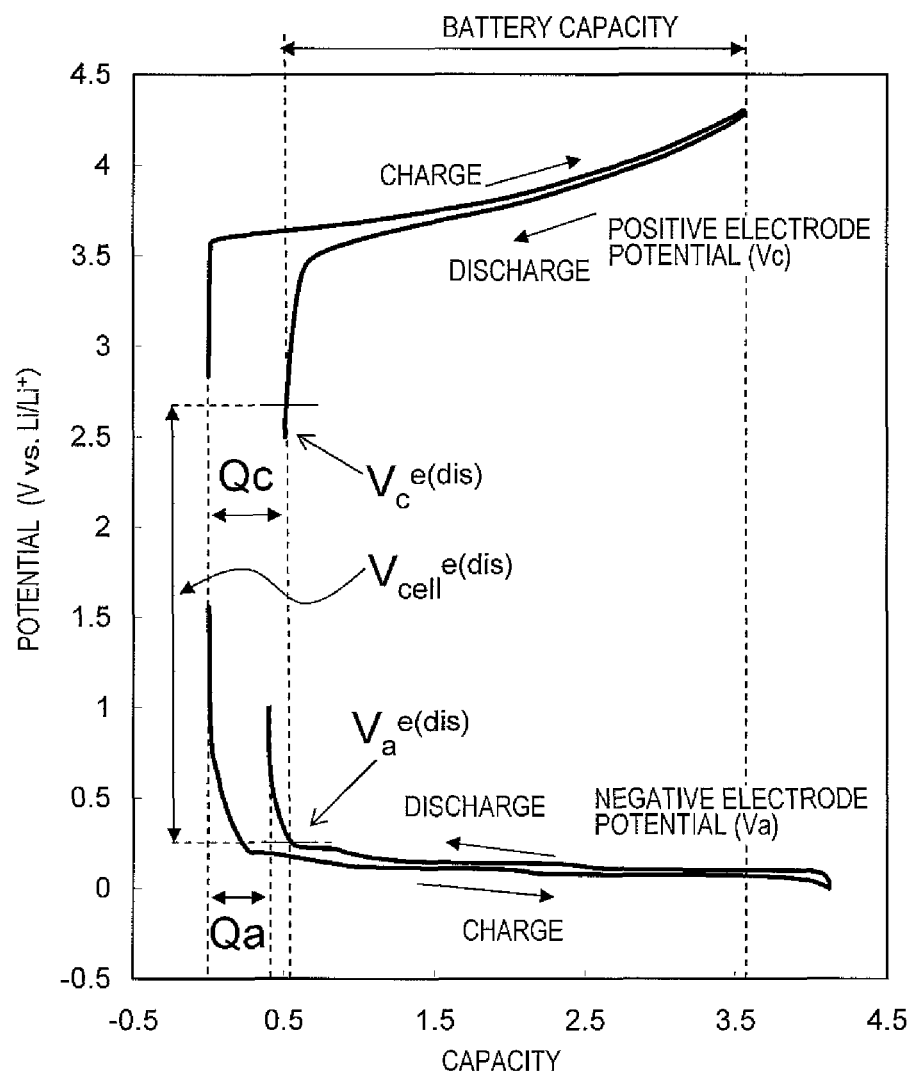
FIG. 3 A graph illustrating an example of charge/discharge behavior of a conventional lithium secondary battery.

FIG. 3 is a graph illustrating an example of charge/discharge behavior of a conventional lithium secondary battery in which a graphite-type material is used as the negative-electrode active material and a nickel-type lithium-containing complex oxide is used as the positive-electrode active material. The vertical axis represents potential on a lithium metal basis, and the horizontal axis represents relative capacity. In FIG. 3, the positive electrode potential is indicated as Vc, whereas the negative electrode potential is indicated as Va. A battery voltage Vcell at the time of charge/discharge is expressed as a difference (=Va−Vc) between the positive electrode potential and the negative electrode potential.

In the system shown in FIG. 3, the positive electrode and the negative electrode both have irreversible capacities Qc and Qa. The irreversible capacity Qc of the positive electrode is sufficiently larger than the irreversible capacity Qa of the negative electrode. Specifically, the irreversible capacities Qc and Qa are set so as to satisfy Qc/Qa≤1.13.

After gently decreasing from the beginning of discharge, the positive electrode potential Vc drops in the late stage of discharge. The negative electrode potential Va increases very gently from the beginning of discharge. Its potential changes gradually increase in the late stage of discharge, until the negative electrode potential Va soars.

In this system, the positive electrode potential Vc drops before the potential changes in the negative electrode potential Va become large. At this point, the difference (cell voltage) between the positive electrode potential Vc and the negative electrode potential Va becomes equal to or less than a predetermined voltage, and the discharge is stopped. The positive electrode potential when stopping discharge is referred to as "the discharge end potential $Vc^{e(dis)}$ of the positive electrode", and the negative electrode potential as the "negative electrode discharge end potential $Va^{e(dis)}$". The aforementioned predetermined voltage is referred to as a "discharge end voltage $Vcell^{e(dis)}$ of the cell". In this example, the discharge end voltage $Vcell^{e(dis)}$ of the cell is set to 2.5 V, for example.

In contrast, according to the present embodiment, the irreversible capacities Qc and Qa of the positive electrode and the negative electrode are set so that 0.50≤Qc/Qa<1.13. As a result, the discharge end potential $Vc^{e(dis)}$ can be made larger than conventional. Hereinafter, with reference to the drawings, descriptions will be separately given based on the relative sizes of the irreversible capacities Qc and Qa. In the present embodiment, the discharge end voltage $Vcell^{e(dis)}$ of the cell is set to no less than 2.5 V and no more than 3.0 V, for example.

First, with reference to FIG. 4, the charge/discharge behavior in the case where the irreversible capacity Qc of the positive electrode is equal to or greater than the irreversible capacity Qa of the negative electrode (1≤Qc/Qa<1.13) will be described.

Figure 4:
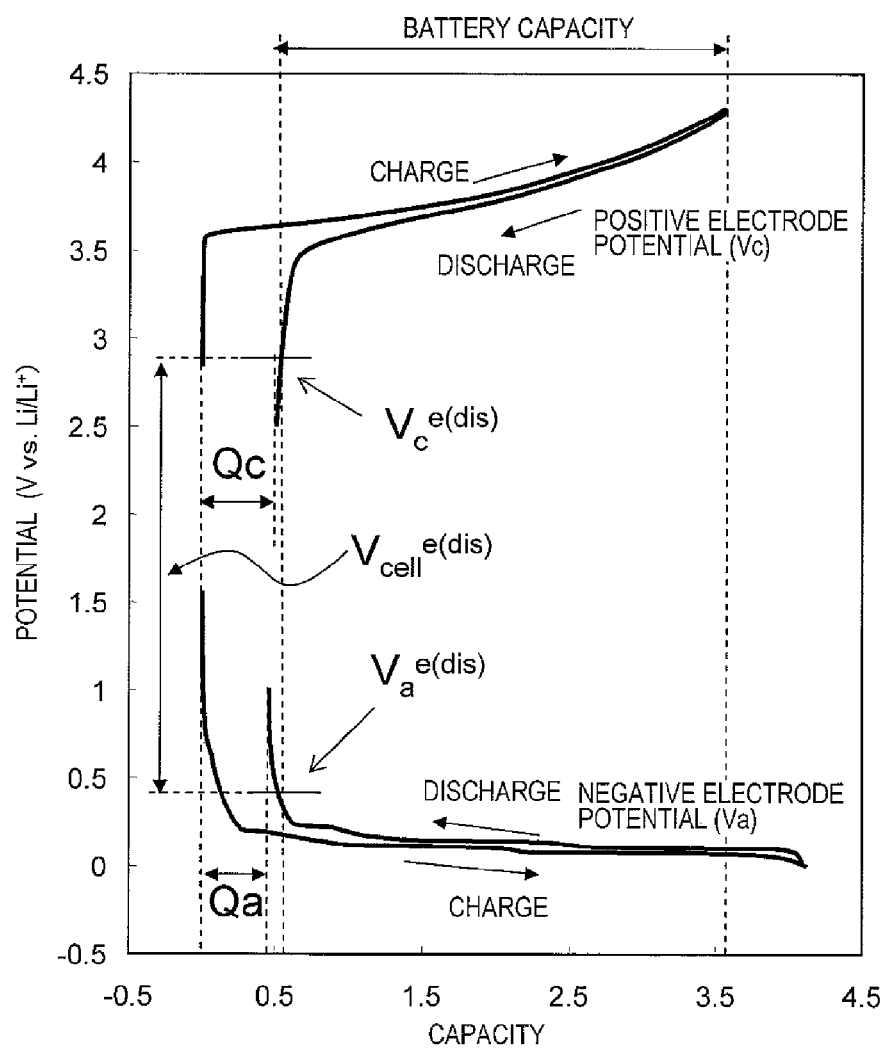
FIG. 4 A graph showing an example of charge/discharge behavior of a lithium secondary battery according to a first embodiment of the present invention.

As can be seen from FIG. 4, when the irreversible capacity ratio Qc/Qa is less than 1.13, the changes in the discharge potential Va of the negative electrode also become large in the late stage of discharge at the positive electrode. Therefore, if the discharge is stopped at a point where the cell voltage becomes equal to or less than the predetermined discharge end voltage $Vcell^{e(dis)}$, the overall cell voltage Vcell when stopping discharge is shifted toward higher potentials from the cell voltage that is shown in FIG. 3. Therefore, the discharge end potential $Va^{e(dis)}$ of the negative electrode and the discharge end potential $Vc^{e(dis)}$ of the positive electrode are both increased from the conventional discharge end potentials shown in FIG. 3.

Next, with reference to FIG. 5, the charge/discharge behavior in the case where the irreversible capacity Qc of the positive electrode is smaller than the irreversible capacity Qa of the negative electrode (0.50≤Qc/Qa<1) will be described.

Figure 5:
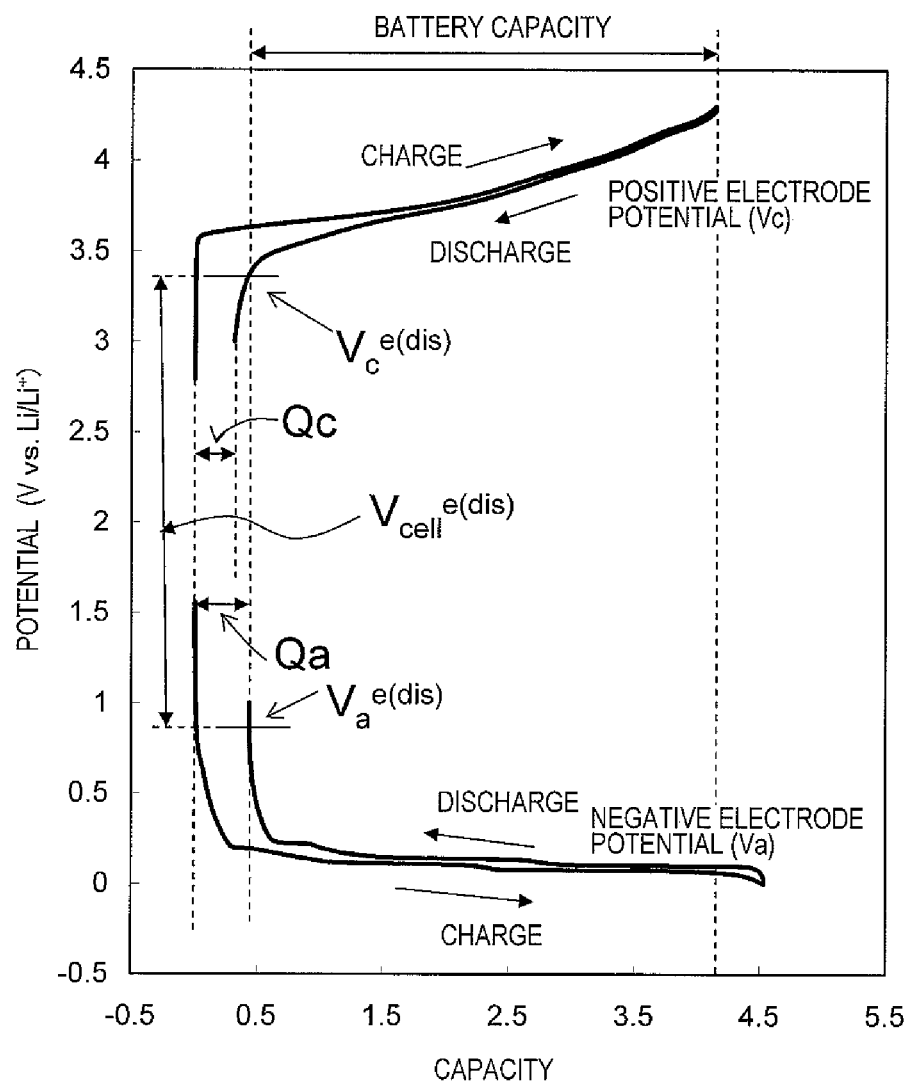
FIG. 5 A graph showing another example of charge/discharge behavior of a lithium secondary battery according to a first embodiment of the present invention.

As can be seen from FIG. 5, if the irreversible capacity Qa of the negative electrode is the greater between the two (Qa>Qc), the cell voltage becomes equal to or less than the predetermined discharge end voltage $Vcell^{e(dis)}$ at the point where the negative electrode potential Va has a steep rise, and the discharge is stopped. This makes it possible to stop discharge at a point before the positive electrode potential Vc has a large fall. Therefore, the discharge end potential $Va^{e(dis)}$ of the negative electrode and the discharge end potential $Vc^{e(dis)}$ of the positive electrode both become higher than the conventional discharge end potentials shown in FIG. 3. A potential control which stops discharge based on a sore of the discharge potential Va of the negative electrode is referred to as restriction by negative electrode potential.

As can be seen from FIG. 4 and FIG. 5, according to the present embodiment, by utilizing a potential increase of the negative electrode in the late stage of discharge, the discharge end potential $Vc^{e(dis)}$ of the positive electrode can be increased to equal to or greater than 2.7 V, for example, and the charge-discharge cycle characteristics can be improved.

On the other hand, although not shown, if the irreversible capacity Qa of the negative electrode is allowed to be too much larger, it becomes impossible to maintain capacity. Specifically, if the irreversible capacity ratio Qc/Qa is less than 0.50, the negative electrode potential will steeply rise before the positive electrode reaches its late stage of discharge, and the discharge will end. The discharge end potential of the positive electrode will be higher than 3.4 V, for example. This will improve the charge-discharge cycle characteristics, but the capacity will become lower. In contrast, according to the present embodiment, by setting the irreversible capacity ratio Qc/Qa to be equal to or greater than 0.50, the negative electrode potential Va is allowed to rise in the late stage of discharge at the positive electrode, thus stopping discharge. As a result, since the discharge end potential $Vc^{e(dis)}$ of the positive electrode can be reduced to equal to or less than 3.4 V, for example, the decrease in capacity can be reduced.

The irreversible capacities Qc and Qa per unit area of the positive electrode and the negative electrode can be determined from irreversible capacities qc and qa and weights of the active materials. The positive-electrode active material has an irreversible capacity qc of 15 to 20 mAh/g, for example, whereas the negative-electrode active material has an irreversible capacity qa of 25 to 30 mAh/g, for example.

The irreversible capacities qc and qa of the positive-electrode active material and the negative-electrode active material are measured through a charge-discharge test (25° C.) in which a lithium metal is used as a counter electrode. The conditions of the charge-discharge test are shown below.

<Conditions of the Charge-Discharge Test for Irreversible Capacity Measurement>

(Positive Electrode)

charging: constant-current 0.2 mA/cm², constant-voltage 4.25 V, end at 0.05 mA/cm² discharge: constant-current 0.2 mA/cm², end at 3.0 V (Negative Electrode)

charging: constant-current 0.2 mA/cm², constant-voltage 0.005 V, end at 0.05 mA/cm² discharge: constant-current 0.2 mA/cm², end at 1.5 V

Adjustments of the irreversible capacity ratio Qc/Qa can be made by appropriately setting the irreversible capacity Qa of the negative electrode, the irreversible capacity Qc of the positive electrode, or both of them.

The irreversible capacity ratio Qc/Qa can be controlled by adjusting the weight of each active material, for example. The weight Wa of the negative-electrode active material and the weight Wc of the positive-electrode active material are preferably adjusted so that the ratio Wc/Wa (hereinafter referred to as "weight ratio") between the weights Wa and Wc is greater than 0.95 but less than 2.25 (0.95<Wc/Wa<2.25), for example. This makes it easy to control the irreversible capacity ratio Qc/Qa to be within the aforementioned range. More preferably, the weights Wc and Wa are adjusted so that 1.10<Wc/Wa<1.65. The weights Wc and Wa can be adjusted based on the kinds of materials for the active materials, and also on the density and thickness of each active material layer. For example, materials for active materials having different particle sizes may be mixed for an increased packing density.

Moreover, the irreversible capacities Qa and Qc of the active materials may be appropriately controlled based on the kinds of materials for the active materials and the methods of preparing them.

At the initial charge/discharge, the irreversible capacity Qa of the negative electrode is said to include an amount of charge A which is consumed for forming an SEI (Solid State Interphase) coating on the negative electrode (graphite) surface and an amount of charge B which is trapped within the crystal structure and cannot be discharged. In the case of a highly crystalline graphite-type material such as artificial graphites and natural graphite, its reversible capacity is close to the theoretical capacity (372 mAh/g). Moreover, the proportion of the amount of charge A in the irreversible capacity Qa is higher than the proportion of the amount of charge B. Since the amount of charge A depends on the amount of edge planes in the graphite, the value of the amount of charge A (and the irreversible capacity Qa) can be controlled by adjusting the specific surface of the graphite material. In order to decrease the amount of charge A so as to attain an irreversible capacity of 30 mAh/g or less, it is preferable that the graphite material has a specific surface of 6.0 $m^2$/g or less. Alternatively, by covering the graphite surface with a polymer binder agent or the like in advance, the amount of charge A can be made small. The amount of charge A may be adjusted by purposely decomposing the polymer binder agent for coverage adjustment through an aftertreatment such as electrode drying. As described earlier, the weight Wa of the negative-electrode active material may be adjusted by mixing graphites with different particle sizes at a predetermined rate for an increased packing density. Furthermore, the graphite surface may be covered in advance with pitch or the like, and optionally subjected to a heat treatment to reduce the amount of charge A. Moreover, the amount of charge A to be consumed for coating formation can be adjusted based on the types and amounts of the solvent for the electrolyte solution and additives.

Other than graphite-type materials, materials having a greater irreversible capacity than that of graphite (e.g., lithium titanate, silicon oxide, etc.) may be used as the negative-electrode active material, in order to control the irreversible capacity Qa of the negative electrode. For example, when forming a negative-electrode active material layer containing a graphite-type material and lithium titanate, the irreversible capacity Qa of the negative electrode can be increased as the rate of lithium titanate relative to the negative-electrode active material becomes higher. Therefore, by adjusting the weight ratio between lithium titanate and the graphite-type material, the irreversible capacity Qa of the negative electrode can be controlled to be in a desired range.

The ratio Wg/Wt of the weight Wg of the graphite-type material to the weight Wt of lithium titanate in the negative-electrode active material is preferably no less than 3 and no more than 100. If the weight ratio Wg/Wt is 3 or less, the reversible capacity will be greatly reduced, whereby the battery capacity may be extremely lowered. On the other hand, if the weight ratio Wg/Wt is 100 or more, the effect of controlling the irreversible capacity Qa through addition of lithium titanate will not be sufficiently attained.

Supposedly, the irreversible capacity Qc of the positive electrode occurs due to a slow rate at which Li occlusion diffuses into the crystal structure in the late stage of discharge. By increasing the ambient temperature to enhance the rate of diffusion, or decreasing the discharge current density to reduce the influence of the rate of diffusion, it is possible to adjust the irreversible capacity Qc of the positive electrode under specific conditions. It is also possible to adjust the capacity Wc of the positive-electrode active material and control the irreversible capacity Qc of the positive electrode. However, in order to ensure a high capacity, a predetermined amount or more of capacity Wc is needed. Therefore, while it is possible to increase the irreversible capacity Qc of the positive electrode by increasing the capacity Wc, it is difficult to decrease it.

In the present embodiment, in order to ensure a high capacity of the positive electrode and maintain a charge/discharge cycle life, it is preferable to increase not only the discharge end potential of the positive electrode but also the charge end potential of the positive electrode from the conventional levels. The charge end potential of the positive electrode on a lithium basis is preferably 4.3 V or more. When the charge end potential is 4.3 V or more, the lithium desorption amount increases, whereby a large capacity becomes available. On the other hand, if the charge end potential is made too high, the changes in the crystal structure (changes in lattice volume) will become large, thus resulting in more deterioration. Specifically, if the charge end potential exceeds 4.5 V, there will be significant destruction of the crystal structure of the positive-electrode active material, which will drastically deteriorate the charge/discharge cycle life. Therefore, the charge end potential of the positive electrode on a lithium basis is preferably 4.5 V or less, and more preferably 4.4 V or less. In this case, the charge end voltage of the lithium secondary battery will be no less than 4.2 V and no more than 4.3 V.

Thus, in the present embodiment, it is preferable that the discharge end potential of the positive electrode and the charge end potential are both made higher than the conventional levels, thus arriving at a potential range of use which is shifted toward higher voltages from that of the conventional positive electrode. As a result of this, capacity losses arising from increasing the discharge end potential of the positive electrode can be compensated for by increasing the charge end potential of the positive electrode. Thus, it becomes possible to reconcile capacity and charge/discharge cycle life.

As the positive-electrode active material in the present embodiment, among other nickel-type lithium-containing complex oxides, it is preferable to use $Li_aNi_{1-(b+c)}Co_bM_cO_2$ (where $1.0 \leq a \leq 1.05$, $0.1 \leq b \leq 0.35$, $0.005 \leq c \leq 0.30$; M is at least one kind selected from among Al, Sr, and Ca).

Generally speaking, an $LiNiO_2$-type active material has a problem in that there are relatively large changes in the crystal structure due to charge/discharge, so that good reversibility cannot be obtained. However, by adjusting its composition as discussed above, it is possible to obtain an improved reversibility while maintaining a high capacity. The reasons thereof are described below.

When the a value is 1.0 or more, there is a sufficient amount of lithium salt used as the source material, and the presence of impurities which are electrochemically inactive, e.g., nickel oxide and cobalt oxide, will be reduced, so that decreases in capacity will be less likely to occur. When the a value is 1.05 or less, there is no excess of lithium salt used as the source material, so that lithium compounds are restrained from remaining as impurities, whereby decreases in capacity will similarly become less likely to occur. Note that the a value is a composition ratio in the uncharged state.

When the b value is 0.10 or more, the charge/discharge reversibility can be improved with greater certainty. When the b value is 0.35 or less, decreases in capacity are unlikely to occur. Furthermore, it is preferable in terms of thermal stability that the c value is in the range of $0.005 \leq c \leq 0.30$. It is particularly preferable that $0.01 \leq c \leq 0.10$.

Hereinafter, with reference to the drawings, the construction of the lithium secondary battery of the present embodiment will be described.

Figure 6:
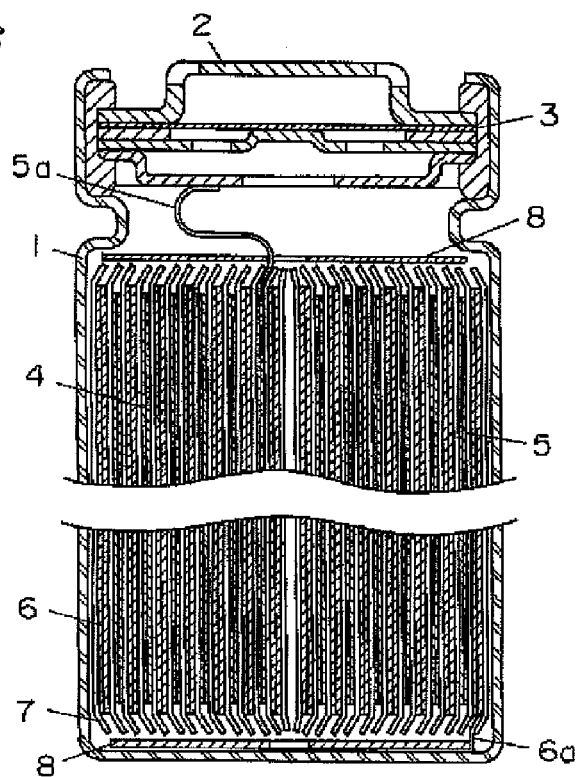
FIG. 6 A schematic cross-sectional view showing an example of a lithium secondary battery according to a first embodiment of the present invention.

FIG. 6 is a schematic cross-sectional view showing an example of a lithium secondary battery of the present embodiment.

The lithium secondary battery includes a battery case 1, an electrode group 4 accommodated in the battery case 1, and insulation rings 8 respectively disposed above and below the electrode group 4. The battery case 1 has an upper opening, the opening being sealed with a sealing plate 2.

The electrode group 4 is constructed so that a positive electrode 5 and a negative electrode 6 are wound a plurality of times in spirals via a separator 7. A positive electrode lead 5a of e.g. aluminum extends from the positive electrode 5, whereas a negative electrode lead 6a of e.g. copper extends from the negative electrode 6. The positive electrode lead 5a is connected to the sealing plate 2 of the battery case 1. The negative electrode lead 6a is connected to the bottom of the battery case 1. Although not shown, together with the electrode group 4, an electrolyte solution is injected into the interior of the battery case 1.

Such a lithium secondary battery is produced as follows. First, the negative electrode 6 and the positive electrode 5 are formed, and are wound together with the separator 63, thereby forming the electrode group 4. Next, the respective insulation plates 8 are attached over and under the electrode group 4. Moreover, the positive electrode lead 5a extending from the positive electrode 4 is welded to the sealing plate 66, and the negative electrode lead 6a extending from the negative electrode 6 is welded to the bottom of the battery case 1; and these are inserted into the battery case 1. Thereafter, a nonaqueous electrolyte (not shown) which conducts lithium ions is injected into the battery case 1, and the opening of the battery case 1 is sealed with the sealing plate 2, via an insulation packing 3.

The positive electrode 5 in the present embodiment includes a positive-electrode current collector and a positive electrode mixture layer formed on the surface of the positive-electrode current collector.

The positive-electrode current collector may be a metal foil of aluminum or the like, a metal foil that has been subjected to lathing or etching, etc., for example. As the material of the positive-electrode current collector, those which are routinely used in the field can be used. For example, metal materials such as stainless steel, titanium, or aluminum can be used.

The positive electrode mixture layer is formed on one face or both faces of the positive-electrode current collector by the following method, for example. First, a positive electrode mixture paste is produced by allowing a positive-electrode active material, a binder agent, a conductive agent, and optionally a thickener to be kneaded and dispersed in a solvent. Next, the positive electrode mixture is applied onto the surface of the positive-electrode current collector, and then dried to produce a positive electrode mixture layer. Then, the positive-electrode current collector with the positive electrode mixture layer formed thereon is subjected to rolling. Thus, the positive electrode 5 is obtained. The thickness of the positive electrode 5 (total thickness of the positive electrode mixture layer and the current collector) is 100 µm to 200 µm, for example. Moreover, it is preferable that the positive electrode 5 is flexible.

As the positive-electrode active material, the positive electrode mixture layer in the present embodiment contains a nickel-type lithium-containing complex oxide that is capable of occluding and releasing lithium. The preferable composition of the nickel-type lithium-containing complex oxide is the same as the aforementioned composition.

There are no particular limitations as to the binder agent to be used for the positive electrode mixture layer, so long as it is a material which is stable with respect to the solvent and electrolyte solution used. For example, a fluorine-type binder agent, an acrylic rubber, a modified acrylic rubber, styrene-butadiene rubber (SBR), isopropylene rubber, butadiene rubber, an acrylic polymer, a vinyl-type polymer, or the like may be used by itself, or two or more of them may be used in a mixture or copolymer. As the fluorine-type binder agent, for example, polyvinylidene fluoride (PVDF), a copolymer of vinylidene fluoride (VDF) and hexafluoropropylene (HFP) (P(VDF-HFP)), a dispersion of polytetrafluoroethylene resin, or the like can be suitably used.

As the thickener, carboxymethyl cellulose, methyl cellulose, hydroxymethyl cellulose, ethyl cellulose, polyvinyl alcohol, oxidized starch, phosphated starch, casein, or the like may be suitably used.

As the conductive agent, acetylene black, artificial graphite, natural graphite, carbon fiber, or the like may be used by itself, or two or more of them may be used in a mixture.

There are no particular limitations as to the solvent, so long as the binder agent can be dissolved into the solvent. In the case of using an organic-type binder agent, an organic solvent such as N-methyl-2-pyrrolidone (NMP), N,N-dimethylformamide, tetrahydrofuran, dimethylacetamide, dimethyl sulfoxide, hexamethyl sulfonamide, tetramethylurea, acetone, or methyl ethyl ketone can be used, for example. Any such organic solvent may be used by itself, or a mixed solvent containing two or more of these may be used. In the case of using an aqueous binder agent, it is preferable to use water or hot water as the solvent.

The negative electrode 6 in the present embodiment includes a negative-electrode current collector and a negative electrode mixture layer formed on the surface of the negative-electrode current collector.

As the negative-electrode current collector, a rolled-out foil, an electrolytic foil, etc. of copper or a copper alloy can be used, for example. There are no particular limitations as to the shape of the negative-electrode current collector; other than foils, holed foils, expanded materials, lath materials, or the like may be used. The negative-electrode current collector is preferably as thick as possible because the tensile strength will increase. The thickness of the negative-electrode current collector is 8 µm or more, for example. On the other hand, if the negative-electrode current collector becomes too thick, the volume of voids in the interior of the battery case becomes small, thus possibly lowering the energy density. Therefore, the thickness of the negative-electrode current collector is preferably 20 µm or less, and more preferably 15 µm or less.

The negative mixture layer is formed on one face or both faces of the negative-electrode current collector by the following method, for example. First, a negative electrode mixture paste is produced by allowing a negative-electrode active material, a binder agent, and optionally a thickener and a conductive aid to be kneaded and dispersed in a solvent. Next, the negative electrode mixture is applied onto the surface of the negative-electrode current collector, and then dried to produce the negative electrode mixture layer. Then, the negative-electrode current collector with the negative electrode mixture layer formed thereon is subjected to rolling. Thus, the negative electrode 6 is obtained. The thickness of the negative electrode 6 (total thickness of the negative electrode mixture layer and the current collector) is 100 µm to 210 µm, for example. Moreover, it is preferable that the negative electrode 6 is flexible.

As the negative-electrode active material, a graphite-type material such as those mentioned above is used. As the conductive aid to be used for the negative electrode mixture layer, conductive agents similar to those for the positive electrode mixture mentioned above can be used.

In the present embodiment, the material, structure, weight, and the like of each active material are appropriately set so that, at any portion where the positive electrode and the negative electrode oppose each other, the ratio Qc/Qa between the irreversible capacity Qc of the positive-electrode active material and the irreversible capacity Qa of the negative-electrode active material is equal to or greater than 0.50 but less than 1.13.

There are no particular limitations as to the method of producing paste mixtures of the positive electrode and the negative electrode. For example, a positive electrode or negative-electrode active material, a binder agent, and the optionally-added conductive agent or conductive aid can be kneaded and dispersed in a solvent by using a planetary mixer, a homomixer, a pin mixer, a kneader, a homogenizer, or the like. Any such method of production may be used by itself or in combination. Furthermore, when kneading and dispersing them in the solvent, various dispersants, surfactants, stabilizers, or the like may be optionally added.

There are no particular limitations as to the method of applying and drying the mixture (application-drying). A paste mixture which is kneaded and dispersed in a solvent can be easily applied onto the current collector surface by using a slit die coater, a reverse roll coater, a lip coater, a blade coater, a knife coater, a gravure coater, a dip coater, or the like, for example. The applied mixture may be dried by a method which is close to natural drying. From the perspective of producibility, it is preferable to carry out drying at a temperature from 70° C. to 200° C.

There are no particular limitations as to the method of rolling the current collector having the mixture layer formed thereon. For example, using a roll press machine, rolling may be performed a plurality of times with a line pressure of 1000 to 2000 kg/cm, until the mixture layer attains a predetermined thickness. Alternatively, rolling may be performed a plurality of times with different line pressures.

As the separator 7, a microporous film or nonwoven fabric of a polyolefin resin, such as polyethylene resin or polypropylene resin, can be used. The microporous film or nonwoven fabric may be a single layer, or have a multilayer structure. Preferably, a separator having a two-layer structure consisting of a polyethylene resin layer and a polypropylene resin layer, or a three-layer structure consisting of two polypropylene resin layers and a polyethylene resin layer interposed between them, is used. It is preferable that any such separator has a shutdown function. The separator 7 preferably has a thickness of no less than 10 µm and no more than 30 µm, for example.

The nonaqueous electrolyte contains a nonaqueous solvent and an electrolyte. The nonaqueous solvent contains a cyclic carbonate and a chain carbonate as main components, for example. Preferably, the cyclic carbonate is at least one kind selected from ethylene carbonate (EC), propylene carbonate (PC), and butylene carbonate (BC). Moreover, it is preferable that the chain carbonate is at least one kind selected from dimethyl carbonate (DMC), diethyl carbonate (DEC), ethyl methyl carbonate (EMC), and the like. The electrolyte contains a lithium salt which is strongly electron-withdrawing, for example. As such a lithium salt, $LiPF_6$, $LiBF_4$, $LiClO_4$, $LiAsF_6$, $LiCF_3SO_3$, $LiN(SO_2CF_3)_2$, $LiN(SO_2C_2F_5)_2$, $LiC(SO_2CF_3)_3$, or the like can be used, for example. One kind of these electrolytes may be used by itself, or two or more kinds of them may be used in combination. It is also preferable that these electrolytes are dissolved in the aforementioned nonaqueous solvent at a concentration of 0.5 to 1.5M.

The nonaqueous electrolyte solution may contain a polymer material. For example, a polymer material which is capable of gelating a liquid substance can be used. As the polymer material, those which are routinely used in the field can be used, e.g., polyvinylidene fluoride, polyacrylonitrile, and polyethylene oxide.

The lithium secondary battery of the present embodiment is broadly applicable to the power supplies of electronic devices such as mobile phones, vehicles such as electric vehicles, and electric motors of power tools or the like, for example. Devices such as electronic devices, vehicles, and power tools may be constructed so that a battery pack (or battery module) having the aforementioned charge/discharge system is detachably attached thereto. In this case, a control device including a charge control section, a discharge control section, and a voltage measurement section may be provided within the battery pack (or battery module). Alternatively, the control device may be provided at the device side.

In the present specification, a "battery pack" refers to one or more batteries (cells) being accommodated within a single container. For safety concerns and the like, a protection circuit and a control circuit are optionally provided in the battery pack. On the other hand, a large-sized power supply having multiple lithium secondary batteries may particularly be termed a "battery module". A battery module can be used as the power supply of an electric vehicle or an electric storage system for household use. For safety concerns, a cooler may be provided in the battery module in addition to the lithium secondary battery and control device.

In the case where the present embodiment is applied to a vehicle such as an electric vehicle, the vehicle may have a body and a prime mover for driving the body, such that the prime mover includes an electric motor which is driven by the lithium secondary battery. In the case of an electric motor, it suffices if the lithium secondary battery can be charged or discharged so that the discharge end voltage is within the aforementioned range. As the prime mover, only an electric motor to be driven with the secondary battery may be included (electric vehicle), or an electric motor to be driven with the secondary battery and an internal combustion engine may be included (hybrid car). The vehicle may be an ordinary car such as a sedan type or a wagon type, a subcompact car, a motorcycle, or the like.

<A Study Concerning the Relationship Between the Discharge End Potential of the Positive Electrode and Charge-Discharge Cycle Characteristics>

In order to study the relationship between the discharge end potential of the positive-electrode active material during charge/discharge and the charge/discharge reversibility, the inventors have produced a cell for evaluation, which was subjected to an evaluation test (Experiment 1 and Experiment 2). Hereinafter, the method and results thereof will be described.

(Experiment 1)

(1-1) Production of Positive-Electrode Active Materials A and B

As the positive-electrode active material, two kinds of nickel-type lithium-containing complex oxides of different compositions were used. Specifically, a positive-electrode active material (hereinafter referred to as "positive-electrode active material A") having a composition expressed as $LiNi_{0.815}Co_{0.15}Al_{0.035}O_2$ and positive-electrode active material B having a composition expressed as $LiNi_{0.76}Co_{0.14}Al_{0.10}O_2$ were used.

A method of producing positive-electrode active material A is described below.

First, an aqueous solution containing nickel sulfate at a concentration of 0.815 mol/l, an aqueous solution containing cobalt sulfate at a concentration of 0.15 mol/l, and an aqueous solution containing aluminum sulfate at a concentration of 0.035 mol/l were prepared and mixed. Next, the mixed aqueous solution was continuously supplied into a reaction vessel. Thereafter, while adding sodium hydroxide to the reaction vessel dropwise so that the aqueous solution in the reaction vessel would be maintained at a pH between 10 and 13, a precursor of the active material was synthesized. The resultant precursor was washed well with water, and dried. In this manner, a hydroxide expressed as $Ni_{0.815}Co_{0.15}Al_{0.035}(OH)_2$ was obtained as the precursor.

The resultant precursor and lithium carbonate were mixed so that lithium, cobalt, nickel, and aluminum had a molar ratio (Ni:Co:Ni:Al) of 1:0.815:0.15:0.035. In an oxygen ambient, the mixture was prebaked at a temperature of 500° C. for 7 hours, and pulverized. Next, the pulverized bake was again baked at a temperature of 800° C. for 15 hours. After the bake was pulverized, it was subjected to a size classification, whereby positive-electrode active material A was obtained.

A method of producing positive-electrode active material B is described below.

First, an aqueous solution containing nickel sulfate at a concentration of 0.76 mol/l, an aqueous solution containing cobalt sulfate at a concentration of 0.14 mol/l, and an aqueous solution containing aluminum sulfate at a concentration of 0.10 mol/l were prepared and mixed. Next, the mixed aqueous solution was continuously supplied into a reaction vessel. While adding sodium hydroxide into the reaction vessel dropwise so that the aqueous solution in the reaction layer was maintained at a pH between 10 and 13, a precursor of the active material was synthesized. The resultant precursor was washed well with water, and dried. In this manner, a hydroxide expressed as $Ni_{0.76}Co_{0.14}Al_{0.10}(OH)_2$ was obtained as the precursor.

The resultant precursor and lithium carbonate were mixed so that lithium, cobalt, nickel, and aluminum had a molar ratio of 1:0.76:0.14:0.10. In an oxygen ambient, the mixture was prebaked at a temperature of 500° C. for 7 hours, and pulverized. Next, the pulverized bake was again baked at a temperature of 800° C. for 15 hours. After the bake was pulverized, it was subjected to a size classification, whereby positive-electrode active material B was obtained.

(1-2) Production of Working Electrodes

Working electrodes were produced by respectively using the aforementioned positive-electrode active materials A and B.

A method of producing a working electrode by using positive-electrode active material A is described below.

First, to 100 g of a powder of positive-electrode active material A obtained by the method described in (1-1) above, 2 g of acetylene black (conductive agent), 2 g of artificial graphite (conductive agent), 3 g of polyvinylidene fluoride powder (binder agent), and 50 ml of an organic solvent (NMP) were mixed well, thus preparing a paste mixture. This paste mixture was applied on one face of an aluminum foil (positive-electrode current collector) having a thickness of 15 μm. By drying the paste mixture, a positive-electrode active material layer was obtained.

Thereafter, the aluminum foil having the positive-electrode active material layer formed thereon was subjected to rolling, thereby forming a working electrode. The thickness of the working electrode, i.e., a total thickness of the current collector and the positive-electrode active material layer, was 65 μm, and the working electrode capacity per unit area was 3.0 mAh/cm$^2$. Note that this working electrode capacity is a capacity of the case where constant-current charging and discharging was conducted under conditions such that charge current value: 0.1 mA/cm$^2$; end voltage: 4.25 V; discharge current value: 0.1 mA/cm$^2$; end voltage: 3.0 V, by using a lithium metal as a counter electrode.

Next, A method of producing a working electrode by using positive-electrode active material B is described below.

First, to 100 g of a powder of positive-electrode active material B obtained by the method described in (1-1) above, 5 g of acetylene black (conductive agent), 3 g of synthetic polyvinylidene fluoride powder (binder agent), and 50 ml of an organic solvent (NMP) were mixed well, thus preparing a paste mixture. This paste mixture was applied on one face of an aluminum foil (positive-electrode current collector) having a thickness of 15 μm. By drying the paste mixture, a positive-electrode active material layer was obtained.

Thereafter, the aluminum foil having the positive-electrode active material layer formed thereon was subjected to rolling, thereby forming a working electrode. The thickness of the working electrode, i.e., a total thickness of the current collector and the positive-electrode active material layer, was 51 μm, and the working electrode capacity per unit area was 1.6 mAh/cm$^2$. Note that this working electrode capacity is a capacity of the case where constant-current charging and discharging was conducted under conditions such that charge current value: 0.1 mA/cm$^2$; end voltage: 4.25 V; discharge current value: 0.1 mA/cm$^2$; end voltage: 3.0 V, by using a lithium metal as a counter electrode.

(1-3) Production of a Counter Electrode

In evaluation cells of this experiment, similar counter electrodes were used regardless of the kind of positive-electrode active material. A method of producing a counter electrode is described below.

As an active material of the counter electrode, 100 g of artificial graphite, 2.5 g of "BM-400B (trade name)" manufactured by ZEON CORPORATION (an aqueous dispersion containing 40 weight % of denatured styrene-butadiene copolymer) as a binder agent, 1 g of CMC as a thickener, and an appropriate amount of water were agitated in a planetary mixer, thus preparing a paste mixture. This paste mixture was applied on one face of an electrolytic copper foil having a thickness of 10 μm. Thereafter, the paste mixture was dried, whereby an active material layer of a counter electrode was obtained.

Next, the electrolytic copper foil having the active material layer formed thereon was subjected to rolling, whereby a counter electrode having a thickness of 80 μm was obtained. In order to evaluate the performance of the working electrode, the capacity of the counter electrode was made greater than the capacity of the working electrode. Specifically, the counter electrode capacity per unit area was 4.1 mAh/cm$^2$. Note that this counter electrode capacity is a capacity of the case where constant-current charging and discharging was conducted under conditions such that charge current value: 0.1 mA/cm$^2$; end voltage: 0 V; discharge current value: 0.1 mA/cm$^2$; end voltage: 1.5 V, by using a lithium metal for the counter electrode.

In an evaluation test described later, an amount of lithium equivalent to 0.5 mAh/cm$^2$ was allowed to be electrochemically occluded onto the counter electrode in advance, so that the discharge end voltage of the cell for evaluation would not be affected by changes in the discharge potential of the counter electrode. Note that "electrochemical occlusion of lithium" was performed as follows. Apart from the evaluation cell, a cell for preliminary charging was produced. In the cell for preliminary charging, the counter electrode of the evaluation cell was used as a working electrode, and a lithium metal was used as the counter electrode. By only conducting charging on the cell for preliminary charging, lithium was allowed to be occluded by the working electrode (i.e., the counter electrode of the evaluation cell). As a result, in the late stage of discharge, the point at which the potential of the counter electrode rises can be made sufficiently later than the point at which the potential of the working electrode has a large fall. As a result, in the evaluation test, the potential of the counter electrode can be kept substantially constant.

(1-4) Construction and Method of Production of Evaluation Cell

In this experiment, as an evaluation cell, a stacked cell including an electrode group which is composed of stacking a positive electrode, a separator, and a negative electrode is used.

Figure 7:
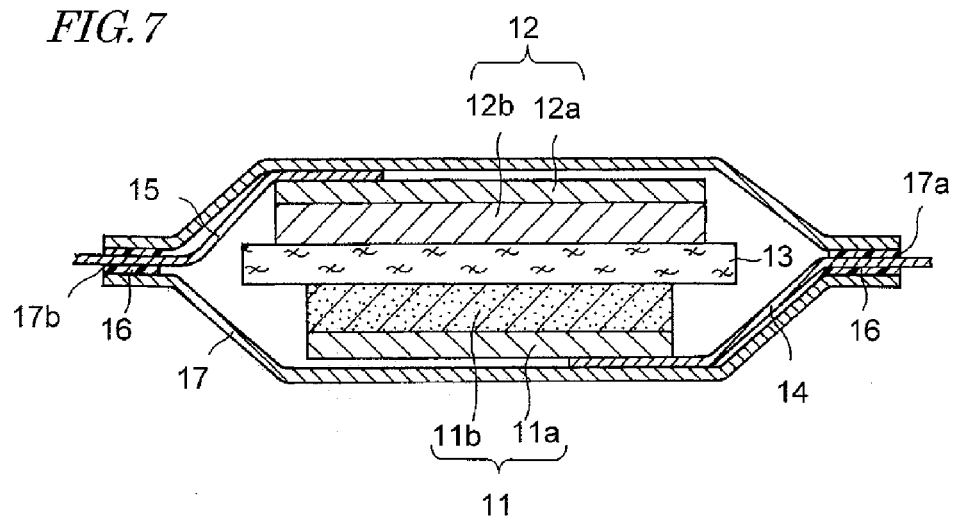
FIG. 7 A cross-sectional view schematically showing the construction of an evaluation cell.

FIG. 7 is a cross-sectional view schematically showing the construction of an evaluation cell used in this experiment.

The evaluation cell includes a positive electrode 11, a negative electrode 12, a separator 13, a positive electrode lead 14, a negative electrode lead 15, a gasket 16, and an outer case 17. Herein, the working electrode produced in (1-2) above is used as the positive electrode 11, and the counter electrode produced in (1-3) above is used as the negative electrode 12. The positive electrode 11 includes a positive-electrode current collector 11a and a positive-electrode active material layer 11b, whereas the negative electrode 12 includes a negative-electrode current collector 12a and a negative-electrode active material layer 12b. The separator 13 is disposed between the positive-electrode active material layer 11b and the negative-electrode active material layer 12b. The positive electrode lead 14 is connected to the positive-electrode current collector 11a, and the negative electrode lead 15 is connected to the negative-electrode current collector 12a. The electrode group composed of the positive electrode 11, the negative electrode 12, and the separator 13 is contained in the outer case 17 together with an electrolyte.

Next, a method of producing the evaluation cell is described.

The working electrode in which positive-electrode active material A was used was cut into a size of 20 mm×20 mm, whereby the positive electrode 11 was obtained. Similarly, the counter electrode obtained in (1-3) above was cut into 20 mm×20 mm, whereby the negative electrode 12 was obtained. Next, in portions of the current collectors 11a and 12a of the positive electrode 11 and the negative electrode 12 where the active material layers 11b and 12b were not formed, leads 14 and 15 were welded, respectively.

Thereafter, the positive electrode 11, the separator 13, and the negative electrode 12 were stacked so that the positive-electrode active material layer 11b and the negative-electrode active material layer 12b opposed each other via the separator (polyethylene microporous film) 13, thus producing an electrode group. Together with 0.5 g of electrolyte, this electrode group was inserted into the outer case 17 made of an aluminum laminate. As the electrolyte, in a solvent mixture in which ethylene carbonate (EC), ethyl methyl carbonate (EMC), and diethyl carbonate (DEC) were mixed at a volume ratio of EC:EMC:DEC=2:3:5, LiPF$_6$ was dissolved to a concentration of 1.0 mol/L. Thereafter, vinylene carbonate was further added with a weight ratio of 2%, whereby the electrolyte solution was obtained.

Next, a lithium metal was provided as a reference electrode. The reference electrode (not shown) was placed in the neighborhood of the positive electrode 30 in the outer case 17. The working electrode lead, the counter electrode lead, and the reference electrode lead were allowed to extend outside the outer case 17 through openings of the outer case 17. Thereafter, the openings of the outer case 17 were welded while vacuuming the interior of the outer case 17. In this manner, the evaluation cell (hereinafter referred to as "evaluation cell A") in which positive-electrode active material A was used was produced.

With a method similar to the above, an evaluation cell (hereinafter referred to as "evaluation cell B") was produced whose positive electrode 11 was a working electrode in which the positive-electrode active material B was used.

(1-5) Evaluations of Initial Capacity and Charge/Discharge Reversibility

Next, evaluation cells A and B were subjected to charge-discharge tests to examine the relationship between the discharge end potential of the working electrode and the initial capacity and charge/discharge reversibility. Herein, Tests 1 to 7 were conducted by using evaluation cell A, and Test 8 was conducted by using evaluation cell B.

The evaluation conditions and results of Tests 1 to 7 are shown below.

(i) Tests 1 to 7 (Evaluation Cell A)

First, a first cycle of charge/discharge was conducted under the following conditions.

<Conditions of Initial Capacity Evaluation>
constant-current charging: 8 mA, end voltage 4.2 V
constant-voltage charging: end current 0.3 mA, pause time 20 minutes
constant-current discharging: 2.4 mA, end voltage (as described in Table 1), pause time 20 minutes
test temperature: as described in Table 1

After conducting the first cycle of charge/discharge, a discharge capacity per active material weight of the positive electrode (working electrode) in the first cycle of charge/discharge was calculated, which was defined as a "capacity of use (mAh/g)". The capacities of use are shown in Table 1.

Moreover, the lithium contents in positive-electrode active material A when stopping charge and when stopping discharge (discharge end), i.e., the x values in the composition Li$_x$Ni$_{0.815}$Co$_{0.15}$Al$_{0.035}$O$_2$ of positive-electrode active material A, were examined. The x values at the discharge end are shown in Table 1. In all of Tests 1 to 7, the x value when stopping charge was 0.232.

Next, the discharge current value was increased, and second and subsequent cycles of charge/discharge were conducted under the following conditions.

<Conditions of Charge/Discharge Reversibility Evaluation>
constant-current charging: 8 mA, end voltage 4.2 V
constant-voltage charging: end current 0.3 mA, pause time 20 minutes
constant-current discharging: 12 mA, end voltage (as described in Table 1), pause time 20 minutes
test temperature: as described in Table 1

After repeating charge/discharge under the above conditions, a value obtained by dividing the amount of capacity decrease at an n$^{th}$ cycle by the cycle number n was calculated and defined as a "capacity deterioration rate (%/cycle)". In Tests 1 to 5 and 7, a capacity deterioration rate at the 500$^{th}$ cycle (n=500) was determined. In Test 6, evaluation cell A had such a large deterioration that charge/discharge could not be repeated as often as 500 cycles. Therefore, a capacity deterioration rate (n=150) at the 150$^{th}$ cycle was determined. The results are shown in Table 1.

(ii) Test 8 (Evaluation Cell B)

First, a first cycle of charge/discharge was conducted under the following conditions.

<Conditions of Initial Capacity Evaluation>
constant-current charging: 4 mA, end voltage 4.2 V
constant-voltage charging: end current 0.15 mA, pause time 20 minutes
constant-current discharging: 1.2 mA, end voltage 3.0 V, pause time 20 minutes
test temperature: 45° C.

After conducting the first cycle of charge/discharge, "a capacity of use (mAh/g)" was calculated similarly to Tests 1 to 7, which is shown in Table 1.

Moreover, the lithium contents in positive-electrode active material B when stopping charge and when stopping discharge (discharge end), i.e., the x values in the composition $Li_xNi_{0.76}Co_{0.14}Al_{0.10}O_2$ of positive-electrode active material B, were examined. The x value at the discharge end is shown in Table 1. In Test 8, the x value when stopping charge was 0.230.

Next, the discharge current value was increased, and second and subsequent cycles of charge/discharge were conducted under the following conditions.

<Conditions of Charge/Discharge Reversibility Evaluation>
constant-current charging: 4 mA, end voltage 4.2 V
constant-voltage charging: end current 0.15 mA, pause time 20 minutes
constant-current discharging: 6 mA, end voltage 3.0 V, pause time 20 minutes
test temperature: 45° C.

After repeating charge/discharge under the above conditions, a capacity deterioration rate at the 500$^{th}$ cycle (n=500) was determined, which is shown in Table 1.

Thus, it has been confirmed that, by setting the discharge end potential of the positive-electrode active material to be no less than 2.7 V and no more than 3.4 V, the capacity deterioration rate of the cell can be lowered while maintaining the capacity of use.

In this experiment, in studying the range of discharge end potential of the positive electrode, the capacities of the negative electrode and the negative electrode are adjusted so that the discharge potential of the positive electrode drops in a region where changes in the discharge potential of the negative electrode are gentle. This is the reason why the discharge end voltage of the cell changes depending on the discharge end potential of the positive electrode in Table 1. Note that, in the above-described embodiment (FIG. 4, FIG. 5), discharge is stopped when the discharge end voltage of the cell becomes equal to a predetermined voltage or less. Therefore, the discharge end voltage of the cell does not change depending on the discharge end potential of the positive electrode.

(Experiment 2)

A cylindrical evaluation cell (referred to as "evaluation cell C") was produced in which $LiNi_{0.815}Co_{0.15}Al_{0.035}O_2$ as used as the positive-electrode active material, and was subjected to charge-discharge cycle characteristics evaluation. The method and results thereof will be described below.

(2-1) Production of Positive Electrode

In an organic solvent (NMP), to 100 g of $LiNi_{0.815}Co_{0.15}Al_{0.035}O_2$ powder, 1.25 g of acetylene black (conductive agent), 1.25 g of artificial graphite (conductive agent), and 2.7 g of polyvinylidene fluoride powder (binder agent) were mixed well, thus preparing a paste mixture. This

TABLE 1

| Test No. | evaluation cell | discharge end voltage of cell (V) | discharge end potential of working electrode (V) | X value at discharge end | test temperature | capacity of use (mAh/g) | capacity deterioration rate (% cycle number) |
|---|---|---|---|---|---|---|---|
| 1 | A | 3.2 | 3.35 | 0.935 | 45° C. | 189 | 0.040 |
| 2 | A | 3.0 | 3.16 | 0.938 | 45° C. | 196 | 0.044 |
| 3 | A | 2.75 | 2.95 | 0.950 | 45° C. | 200 | 0.046 |
| 4 | A | 2.5 | 2.65 | 0.960 | 45° C. | 202 | 0.057 |
| 5 | A | 2.0 | 2.31 | 0.973 | 45° C. | 206 | 0.102 |
| 6 | A | 1.5 | 1.75 | 1.016 | 45° C. | 218 | 0.422 |
| 7 | A | 2.5 | 2.68 | 0.921 | 25° C. | 191 | 0.056 |
| 8 | B | 3.0 | 3.20 | 0.888 | 45° C. | 172 | 0.043 |

As can be seen from the results of Table 1, as the discharge end potential of the working electrode increases, the capacity deterioration rate decreases, but the capacity of use of the positive-electrode active material decreases. Conversely, as the discharge end potential decreases, the capacity of use of the positive-electrode active material increases, but the capacity deterioration rate increases. It has also been found that, in a potential region with large changes in the discharge potential and little change in the capacity of use (in FIG. 2, the potential region of 3.4 V or less), the capacity deterioration rate significantly changes with the discharge end potential.

Figure 8:
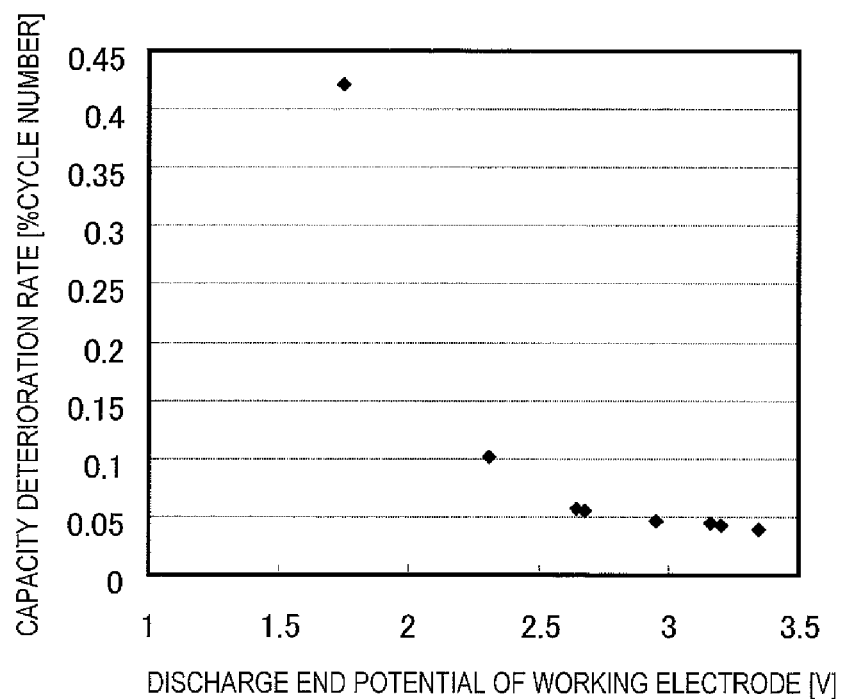
FIG. 8 A graph showing a relationship between the discharge end potential and the capacity deterioration rate of a positive electrode in evaluation cells A and B.

FIG. 8 is a graph showing the relationship between the discharge end potential of the working electrode and the capacity deterioration rate. As can be seen from FIG. 8, when the discharge end potential becomes lower than 2.7 V, the capacity deterioration rate drastically increases.

On the other hand, as can be seen from the graph shown in FIG. 2, a sufficient capacity of use is guaranteed when the discharge end potential is 3.4 V or less.

paste mixture was applied on one face of an aluminum foil (positive-electrode current collector) having a thickness of 15 μm, and thereafter dried to form a positive electrode mixture layer. Next, the positive-electrode current collector having the positive electrode mixture layer formed thereon was subjected to rolling, whereby a positive electrode having a thickness (total thickness of the positive-electrode current collector and the positive electrode mixture layer) of 128 μm was obtained.

(2-2) Production of Negative Electrode

Artificial graphite and natural graphite were mixed at a weight ratio of 60:40, thus preparing a negative-electrode active material. To 100 g of this negative-electrode active material, 0.6 g of a rubber-type binder (binder agent) and 1.0 g of carboxymethyl cellulose (thickener) were mixed well, thus preparing a paste mixture. This paste mixture was applied on one face of a copper foil (negative-electrode current collector) having a thickness of 8 μm, and thereafter dried to form a negative electrode mixture layer. Next, the negative-electrode current collector having the negative electrode mixture layer formed thereon was subjected to rolling, whereby a negative electrode having a thickness (total thickness of the negative-electrode current collector and the negative electrode mixture layer) of 144 μm was obtained.

(2-3) Production of Electrolyte Solution

Ethylene carbonate (EC), ethyl methyl carbonate (EMC), and dimethyl carbonate (DMC) were mixed at a volume ratio of 1:1:8, thus producing a solvent mixture. Next, $LiPF_6$ was dissolved in the solvent mixture to a concentration of 1.4 mol/L. Thereafter, vinylene carbonate was further added with a weight ratio of 16%, whereby an electrolyte solution was obtained.

(2-4) Production of Evaluation Cell C

By using the positive electrode and the negative electrode obtained by the above methods, a cylindrical-shaped lithium secondary battery was produced as an evaluation cell. The evaluation cell had a construction similar to the construction shown in FIG. 6.

Hereinafter, referring back to FIG. 6, the method of production will be described.

First, the positive electrode 5 and the negative electrode 6 were wound a plurality of times in spirals via a separator (a microporous film of polyethylene) 7, thus forming a cylindrical-shaped electrode group 4. On the upper face and lower face of the electrode group 4, insulation rings 8 were respectively disposed. Next, a positive electrode lead 5a of aluminum extending from the positive electrode 5 was connected to a sealing plate 2. Moreover, a negative electrode lead 6a of copper extending from the negative electrode 6 was connected to the bottom of a battery case 1. Thereafter, the electrode group was accommodated in the battery case 1. Then, the electrolyte solution (not shown) was injected into the battery case 1. After the injection of the electrolyte solution, an insulation packing 3 was placed in an opening of the battery case 1, which opening of the battery case 1 was sealed with the sealing plate 2. Thus, as evaluation cell C, a cylindrical battery 18650 having a diameter of 18 mm and a height of 65 mm was obtained.

The design capacity for evaluation cell C was 2900 mAh.

In this experiment, evaluation cell C was constructed so that the discharge end voltage of evaluation cell C would mainly depend on the discharge potential of the positive electrode 5. Therefore, it is possible to control the discharge end potential of the positive electrode 5 by changing the discharge end voltage of evaluation cell C.

(2-5) Evaluation of Charge-Discharge Cycle Characteristics

Evaluation cell C was subjected to charge-discharge tests to examine the relationship between the discharge end voltage of evaluation cell C (discharge end voltage of the battery) and charge-discharge cycle characteristics. Herein, three kinds of charge-discharge tests (Tests 9 to 11) were conducted by varying the discharge end voltage of evaluation cell C.

The evaluation conditions and results of Tests 9 to 11 are shown below.
<Evaluation Conditions>
constant-current charging: 870 mA, end voltage 4.2 V
constant-voltage charging: end current 50 mA, pause time 20 minutes
constant-current discharging: 2900 mA, end voltage (as described in Table 2), pause time 20 minutes
test temperature: 45° C.

After a first cycle of the charge-discharge test, the discharge capacity was determined. As the capacity retention rate, after repeating 500 cycles of the aforementioned charge/discharge, a rate of the discharge capacity at the $500^{th}$ cycle to the discharge capacity at the first cycle was determined. The resultant discharge capacities and capacity retention rates are shown in Table 2. Note that the "capacity ratio" shown in Table 2 is a rate (%) of discharge capacity where the discharge capacity of Test 9 is defined as 100.

(2-6) Measurement of Discharge End Potential of the Positive Electrode

First, apart from evaluation cell C, a cell for potential measurement was produced in order to measure the potential of the positive electrode on a lithium metal basis. The cell for potential measurement was obtained by placing a lithium metal as a reference electrode in a cell having an electrode group including the positive electrode and the negative electrode used for evaluation cell C.

The cell for potential measurement was subjected to charge-discharge tests under the evaluation conditions of Tests 9 to 11, and the discharge end potential of the positive electrode after the first cycle of the charge-discharge test was measured. The measurement results are shown in Table 2.

TABLE 2

| Test No. | evaluation cell | discharge end voltage of battery (V) | discharge end potential of positive electrode (V) | discharge capacity (mAh) (capacity ratio) | capacity retention rate after 500 cycles (%) |
|---|---|---|---|---|---|
| 9 | C | 3.0 | 3.16 | 2862 (97) | 85 |
| 10 | C | 2.75 | 2.90 | 2930 (99) | 80 |
| 11 | C | 2.5 | 2.65 | 2951 (100) | 72 |

As can be seen from the results shown in Table 2, as the discharge end potential of the positive electrode increases, the initial discharge capacity slightly decreases, but the charge/discharge cycle life greatly improves. This is presumably because increasing the discharge end potential suppressed deteriorations of the positive electrode through repetitions of charge/discharge.

In this experiment, too, as in Experiment 1 described above, in studying the range of discharge end potential of the positive electrode, evaluation cell C was constructed so that the discharge end voltage of the cell would depend on the discharge end potential of the positive electrode. This is the reason for the varying discharge end voltage of the cell in Table 2.

Examples 1 to 4 and Comparative Examples 1 to 3

Evaluation cells D to F having different ratios Qc/Qa in irreversible capacity between the positive electrode and the negative electrode were produced, and the relationship between the irreversible capacity ratio Qc/Qa and the discharge end potential of the positive electrode and charge-discharge cycle characteristics was studied.

(3-1) Production of Evaluation Cell D (3-1-1) Production of Positive Electrode

By a method similar to the method described in (1-1) of (Experiment 1), a positive-electrode active material having a composition expressed as $LiNi_{0.815}Co_{0.15}Al_{0.035}O_2$ was produced.

To 100 g of the resultant powder of $LiNi_{0.815}Co_{0.15}Al_{0.035}O_2$, 2 g of acetylene black (conductive agent), 1.25 g of artificial graphite (conductive agent), 1.25 g of polyvinylidene fluoride powder (binder agent), and 50 ml of an organic solvent (NMP) were mixed well, thus preparing a paste mixture. This paste mixture was applied on one face of an aluminum foil having a thickness of 15 μm (positive-electrode current collector). The paste mixture was dried, whereby a positive-electrode active material layer was obtained.

Thereafter, the aluminum foil having the positive-electrode active material layer formed thereon was subjected to rolling to form a positive electrode. The thickness of the positive electrode, i.e., the total thickness of the current collector and the positive-electrode active material layer, was 68 μm, and its reversible capacity per unit area was 3.6 mAh/cm$^2$. The irreversible capacity was 17 mAh/g, 0.32 mAh/cm$^2$. The active material weight per unit area was 19 mg/cm$^2$. Note that the reversible capacity and irreversible capacity of the positive electrode are capacities of the case where constant-current charging and discharging was conducted under the conditions of (charge current value: 0.2 mA/cm$^2$, end voltage: 4.25 V, discharge current value: 0.2 mA/cm$^2$, end voltage: 3.0 V), by using a lithium metal as a counter electrode.

(3-1-2) Production of Negative Electrode

Artificial graphite and natural graphite were mixed at a of weight ratio of 50:50, whereby a negative-electrode active material (average particle size: 17 μm, specific surface: 5.5 m$^2$/g) was obtained. To 100 g of the resultant negative-electrode active material, 0.6 g of a rubber-type binder (binder agent) and 1.0 g of carboxymethyl cellulose (thickener) were mixed well, thus preparing a paste mixture. This paste mixture was applied on one face of a copper foil (negative-electrode current collector) having a thickness of 10 μm. The paste mixture was dried at 190° C., whereby a negative-electrode active material layer was obtained.

Thereafter, the copper foil having the negative-electrode active material layer formed thereon was subjected to rolling to form a negative electrode. The thickness of the negative electrode, i.e., the total thickness of the current collector and the negative-electrode active material layer, was 78 μm. The negative electrode had a reversible capacity per unit area of 360 mAh/g, and an irreversible capacity of 30 mAh/g, 0.34 mAh/cm$^2$. The active material weight per unit area was 11 mg/cm$^2$.

Thus, Qc/Qa of evaluation cell D was 0.94 (=0.32/0.34).

(3-1-3) Construction and Method of Production of Evaluation Cell D

In this Example, as evaluation cell D, a stacked cell including an electrode group which is composed of stacking a positive electrode, a separator, and a negative electrode is used. The construction of the cell is similar to the construction described above with reference to FIG. 7. Hereinafter, referring back to FIG. 7, the method of production will be described.

The positive electrode was cut into a size of 20 mm×20 mm, whereby the positive electrode 11 was obtained. Similarly, the negative electrode was cut into 21 mm×21 mm, whereby the negative electrode 12 was obtained. Next, in portions of the current collectors 11a and 12a of the positive electrode 11 and the negative electrode 12 where the active material layers 11b and 12b were not formed, leads 14 and 15 were welded, respectively.

Thereafter, the positive electrode 11, the separator 13, and the negative electrode 12 were stacked so that the positive-electrode active material layer 11b and the negative-electrode active material layer 12b opposed each other via the separator (polyethylene microporous film) 13, thus producing an electrode group. Together with 0.5 g of electrolyte, this electrode group was inserted into the outer case 17 made of an aluminum laminate. As the electrolyte, in a solvent mixture in which ethylene carbonate (EC), ethyl methyl carbonate (EMC), diethyl carbonate (DEC), and vinylene carbonate (VC) were mixed at a volume ratio of EC:EMC:DEC=2:3:5:0.2, LiPF$_6$ was dissolved to a concentration of 1.0 mol/L. Thus, the electrolyte solution was obtained.

Next, a lithium metal was provided as a reference electrode. The reference electrode (not shown) was placed in the neighborhood of the positive electrode 11 in the outer case 17. The working electrode lead, the counter electrode lead, and the reference electrode lead were allowed to extend outside the outer case 17 through openings of the outer case 17. Thereafter, the openings of the outer case 17 were welded while vacuuming the interior of the outer case 17. In this manner, evaluation cell D was produced.

(3-2) Production of Evaluation Cell E

Artificial graphite and natural graphite were mixed at a of weight ratio of 60:40, whereby a negative-electrode active material (average particle size: 19 μm, specific surface: 4.9 m$^2$/g) was obtained. To 100 g of the resultant negative-electrode active material, 0.6 g of a rubber-type binder (binder agent) and 1.0 g of carboxymethyl cellulose (thickener) were mixed well, thus preparing a paste mixture. This paste mixture was applied on one face of a copper foil (negative-electrode current collector) having a thickness of 10 μm. The paste mixture was dried at 190° C., whereby a negative-electrode active material layer was obtained. Thereafter, the copper foil having the negative-electrode active material layer formed thereon was subjected to rolling to form a negative electrode. The thickness of the negative electrode, i.e., the total thickness of the current collector and the negative-electrode active material layer, was 95 μm.

The negative electrode had a reversible capacity of 360 mAh/g, and an irreversible capacity of 25 mAh/g, 0.35 mAh/cm$^2$. The active material weight per unit area was 14.0 mg/cm$^2$. Otherwise, the construction and the method of production were similar to the construction and method of production of evaluation cell D.

Evaluation cell E had an irreversible capacity ratio Qc/Qa of 0.91 (=0.32/0.35).

(3-3) Production of Evaluation Cell F (Comparative Example)

Artificial graphite and natural graphite were mixed at a weight ratio of 60:40, whereby a negative-electrode active material (average particle size: 19 μm, specific surface: 4.9 m$^2$/g) was obtained. To 100 g of the resultant negative-electrode active material, 0.6 g of a rubber-type binder (binder agent) and 1.0 g of carboxymethyl cellulose (thickener) were mixed well, thus preparing a paste mixture. This paste mixture was applied on one face of a copper foil (negative-electrode current collector) having a thickness of 10 μm. The paste mixture was dried at 190° C., whereby a negative-electrode active material layer was obtained. Thereafter, the copper foil having the negative-electrode active material layer formed thereon was subjected to rolling to form a negative electrode. The thickness of the negative electrode, i.e., the total thickness of the current collector and the negative-electrode active material layer, was 78 μm.

The negative electrode had a reversible capacity of 360 mAh/g, and an irreversible capacity of 25 mAh/g, 0.28 mAh/cm$^2$. The active material weight per unit area was 11 mg/cm$^2$. Otherwise, the construction and the method of production were similar to the construction and method of production of evaluation cell D.

Evaluation cell F had an irreversible capacity ratio Qc/Qa of 1.13 (=0.32/0.28).

(3-4) Production of Evaluation Cell G (Example)

A negative electrode was produced by a method similar to (3-3), except that the total thickness of the active material layer was 80 μm.

The negative electrode had a reversible capacity of 360 mAh/g, and an irreversible capacity of 25 mAh/g, 0.30 mAh/$cm^2$. The active material weight per unit area was 12 mg/$cm^2$. Otherwise, the construction and the method of production were similar to the construction and method of production of evaluation cell D.

Evaluation cell G had an irreversible capacity ratio Qc/Qa of 1.05 (=0.32/0.30).

(3-5) Evaluation of Charge-Discharge Cycle Characteristics

Evaluation cells D to F were subjected to charge-discharge tests to examine the discharge end potential of the positive electrode on a lithium basis and charge-discharge cycle characteristics. Herein, as Examples 1 and 2, evaluation cell D was employed to perform charge-discharge tests while varying the charge end voltage of the cell. As Example 3, evaluation cell E was employed to perform a charge-discharge test. Furthermore, as Comparative Examples 1 to 3, evaluation cell F having an irreversible capacity ratio Qc/Qa of 1.13 was employed to perform charge-discharge tests while varying the charge end voltage of the cell.

The evaluation conditions and results of Examples 1 to 3 and Comparative Examples 1 to 3 are shown below.

<Evaluation Conditions> constant-current charging: 8.4 mA, end voltage (as described in Table 3)

constant-voltage charging: end current 0.3 mA, pause time 20 minutes constant-current discharging: 12 mA, end voltage 2.5 V, pause time 20 minutes test temperature: 25° C.

After a first cycle of the charge-discharge test, the discharge capacity was determined. Then, after repeating 500 cycles of the aforementioned charge/discharge, a rate of the discharge capacity at the $500^{th}$ cycle to the discharge capacity at the first cycle was determined, which was defined as the capacity retention rate. The resultant discharge capacities and capacity retention rates are shown in Table 3. Note that the "capacity ratio" shown in Table 3 is a rate (%) of discharge capacity where the discharge capacity of Comparative Example 1 is defined as 100. The charge end potentials and discharge end potentials of the positive electrode shown in Table 3 are all potentials on a lithium metal basis.

From the results shown in Table 3, it was found that it is possible to control the discharge end potential of the positive electrode with the irreversible capacity ratio Qc/Qa, whereby the charge-discharge cycle characteristics can be improved.

It has been found that, given the same charge end voltage, by reducing the irreversible capacity ratio Qc/Qa to less than 1.13 and utilizing potential changes in the late stage of discharge of the negative electrode to stop discharge (Examples 1 to 4), the charge-discharge cycle characteristics can be greatly improved over the case where the irreversible capacity ratio Qc/Qa is 1.13 or more (Comparative Examples 1 and 2), while reducing the decrease in initial discharge capacity.

Moreover, in evaluation cell F whose irreversible capacity ratio Qc/Qa is 1.13 or more, as the charge end voltage is increased, the initial discharge capacity can increase, but the charge-discharge cycle characteristics are greatly deteriorated (Comparative Examples 1 to 3). On the other hand, in evaluation cell D whose irreversible capacity ratio Qc/Qa is less than 1.13, it has been found that, as the charge end voltage is increased, the decrease in initial discharge capacity can be suppressed more effectively while ensuring charge-discharge cycle characteristics (Examples 1 and 2). Especially in Example 2, by increasing the charge end voltage, the charge-discharge cycle characteristics were improved over the conventional level without allowing the initial discharge capacity to decrease.

Thus, it has been confirmed that, by controlling the irreversible capacity ratio Qc/Qa and the weight ratio Wc/Wa between the positive electrode and the negative electrode into optimum ranges, decreases in the discharge end potential of the positive electrode can be suppressed. As a result, it has been found that charge-discharge cycle characteristics can be improved while suppressing decreases in capacity. It has also been found that, by increasing the discharge end potential and increasing the charge end potential so as to shift the potential range of use at charge/discharge of the positive electrode toward higher potentials than conventionally, the charge-discharge cycle characteristics can be improved while maintaining a high capacity.

Examples 5 to 7

By using a negative-electrode active material containing a graphite-type material and lithium titanate (lithium titanium Oxide; LTO), evaluation cells H to J having mutually different weight ratios between LTO and the graphite-type material

TABLE 3

| | evaluation cell | irreversible capacity ratio Qc/Qa | weight ratio of active material Wc/Wa | charge end voltage of cell | charge end potential of positive electrode | discharge end potential of positive electrode | initial discharge capacity ratio | capacity retention rate after 500 cycles |
|---|---|---|---|---|---|---|---|---|
| Ex. 1 | D | 0.94 | 1.67 | 4.2 V | 4.28 V | 3.16 V | 97 | 78% |
| Ex. 2 | D | 0.94 | 1.67 | 4.3 V | 4.38 V | 3.16 V | 100 | 70% |
| Ex. 3 | E | 0.91 | 1.43 | 4.2 V | 4.28 V | 3.35 V | 95 | 78% |
| Ex. 4 | G | 1.05 | 1.58 | 4.2 V | 4.28 V | 2.90 V | 99 | 72% |
| Comp. Ex. 1 | F | 1.13 | 1.67 | 4.2 V | 4.28 V | 2.67 V | 100 | 68% |
| Comp. Ex. 2 | F | 1.13 | 1.67 | 4.3 V | 4.38 V | 2.64 V | 103 | 58% |
| Comp. Ex. 3 | F | 1.13 | 1.67 | 4.4 V | 4.48 V | 2.64 V | 107 | 32% | were produced. By using these evaluation cells, the relationship between the weight ratio between LTO and the graphite-type material, the ratio of irreversible capacities of the positive electrode and the negative electrode, and the charge-discharge cycle characteristics was studied.

(4-1) Production of Evaluation Cells H to J (4-1-1) Production of Positive Electrode By a method similar to the method described in (2-1) of (Experiment 2), a positive-electrode active material having a composition expressed as $LiNi_{0.815}Co_{0.15}Al_{0.035}O_2$ was produced.

(4-1-2) Production of Negative Electrode

By providing a coating of a mixture of a graphite material and lithium titanate (LTO) on the negative-electrode current collector, a negative electrode was produced.

First, a graphite material was prepared such that artificial graphite and natural graphite were mixed at a weight ratio of 60:40. A rubber-type binder (binder agent), carboxymethyl cellulose (thickener), the graphite material, and LTO were mixed, thereby preparing a paste. The weight ratio between the graphite material and LTO in the paste will be described later. Next, this paste was applied on one face of a copper foil (negative-electrode current collector) having a thickness of 8 μm, and thereafter dried, thus forming a negative-electrode active material layer.

The weights of the graphite material and LTO in each evaluation cell are shown in Table 4. The amounts of the rubber-type binder and carboxymethyl cellulose in each evaluation cell were adjusted so that the weight ratio between the material for the active material (graphite material and LTO), the rubber-type binder, and carboxymethyl cellulose contained in the paste was 100:1:1.

The ratio Wg/Wt of the weight Wg of the graphite material to the weight Wt of LTO, the ratio (irreversible capacity ratio) Qc/Qa of the irreversible capacity Qc of the positive electrode to the irreversible capacity Qa of the negative electrode, and the ratio (active material weight ratio) Wc/Wa of the weight Wc of the positive-electrode active material to the weight Wa of the negative-electrode active material of each evaluation cell are shown in Table 5.

(4-2) Evaluation of Charge-Discharge Cycle Characteristics

By using the positive electrode and the negative electrode obtained by the above method, stacked-type evaluation cells H to J were produced by a method similar to the method of production for evaluation cell D described above in (3-1-3).

Next, evaluation cells H to J were subjected to charge-discharge tests to examine the charge-discharge cycle characteristics. In the charge-discharge tests, the charge end voltage of the cell was 4.2 V and the discharge end voltage of the cell was 2.5 V. The other conditions are the same as the conditions described above in (3-5).

In this Example, too, after a first cycle of the charge-discharge test, the discharge capacity was determined. Then, after repeating 500 cycles of the aforementioned charge/discharge, a rate of the discharge capacity at the $500^{th}$ cycle to the discharge capacity at the first cycle was determined, which was defined as the capacity retention rate. A rate of discharge capacity (%) where the discharge capacity of evaluation cell J was defined as 100 was determined as the initial discharge capacity ratio. The resultant initial discharge capacity ratios and capacity retention rates are shown in Table 5.

TABLE 4

| Example | evaluation cell | weight in negative-electrode active material layer [mg/cm2] | |
|---|---|---|---|
| | | graphite Wg | LTO Wt |
| 5 | H | 10.4 | 2.06 |
| 6 | I | 11.2 | 1.03 |
| 7 | J | 11.5 | 0.52 |

TABLE 5

| Example | evaluation cell | weight ratio of graphite material to LTO Wg/Wt | active material weight ratio Wc/Wa | initial discharge capacity ratio | irreversible capacity ratio Qc/Qa | capacity retention rate after 500 cycles (%) |
|---|---|---|---|---|---|---|
| 5 | H | 5.05 | 1.64 | 93 | 0.63 | 85 |
| 6 | I | 10.9 | 1.67 | 98 | 0.88 | 83 |
| 7 | J | 22.1 | 1.70 | 100 | 1.1 | 80 |

As can be seen from Table 5, as the weight ratio Wg/Wt of the graphite material to LTO in the negative-electrode active material decreases, the irreversible capacity Qa of the negative electrode increases, that is, the irreversible capacity ratio Qc/Qa decreases. Thus it has been confirmed that the irreversible capacity ratio Qc/Qa can be controlled by adjusting the weight ratio Wg/Wt. It has also been found that, by using not only the graphite material but also LTO as the negative-electrode active material, the irreversible capacity ratio Qc/Qa can be reduced as compared to the case of using a graphite material alone (Table 3). Furthermore, it was confirmed in all of Example 5 to 8 that because the irreversible capacity ratio Qc/Qa is equal to or greater than 0.50 but less than 1.13, and decreases in the discharge end potential of the positive electrode are suppressed, the charge-discharge cycle characteristics are improved.

Moreover, it can be seen from the charge-discharge test results that, by increasing the rate which LTO accounts for in the negative-electrode active material, the charge-discharge cycle characteristics are improved, but the discharge capacity ratio is reduced. In other words, if the weight ratio Wg/Wt is too small (e.g. less than 3), capacity may not be guaranteed. On the other hand, if the weight ratio Wg/Wt is too large (e.g. more than 100), there is a possibility that a predetermined irreversible capacity ratio Qc/Qa cannot be obtained and the charge-discharge cycle characteristics cannot be sufficiently improved. The more preferable range of the weight ratio Wg/Wt is no less than 3 and no more than 30, for example.

Although a negative-electrode active material layer in which graphite and LTO are mixed was formed above, the structure and the formation method of the negative-electrode active material layer are not limited thereto. For example, a negative-electrode active material layer having a multilayer structure in which a graphite layer and an LTO layer are stacked may be formed on the negative-electrode current collector. In this case, too, effects similar to the above are obtained. Moreover, forming a graphite layer and then forming an LTO layer thereupon will allow a high-resistance layer having excellent thermal resistance to be formed, which is preferable because improvements in safety are expectable.

INDUSTRIAL APPLICABILITY

The present invention is broadly applicable to a variety of devices in which a lithium secondary battery is used. In particular, applications to power supplies of electronic devices for mobile use, e.g., personal computers, mobile phones, mobile devices, personal digital assistants (PDAs), portable game devices, and camcorders will be useful. It will also be applicable to a secondary battery which assists an electric motor in a hybrid electric vehicle, a fuel cell vehicle, or the like, a power supply for driving a power tool, a vacuum cleaner, a robot, or the like, a motive power source of a Plug-in HEV (Hybrid Electric Vehicle), and so on.

REFERENCE SIGNS LIST 1 battery case
2 sealing plate
3 insulation packing
4 electrode group
5 positive electrode
5a positive electrode lead
6 negative electrode
6a negative electrode lead
7 separator
8 insulation ring
11 positive electrode
11a positive-electrode current collector
11b positive-electrode active material layer
12 negative electrode
12a negative-electrode current collector
12b negative-electrode active material layer
13 separator
14 positive electrode lead
15 negative electrode lead
16 gasket
17 outer case

The invention claimed is:

1. A lithium secondary battery comprising:
a positive electrode having a positive-electrode active material capable of occluding and releasing lithium ions, a negative electrode having a negative-electrode active material capable of occluding and releasing lithium ions, a separator interposed between the positive electrode and the negative electrode, and an electrolyte having lithium-ion conductivity, wherein,
the positive-electrode active material contains a lithium-containing nickel complex oxide;
the negative-electrode active material contains a graphite material having a reversible capacity of 350 mAh/g or more and an irreversible capacity of 30 mAh/g or less; and
a ratio Qc/Qa between an irreversible capacity Qc per unit area in a portion of the positive electrode that opposes the negative electrode and an irreversible capacity Qa per unit area in a portion of the negative electrode that opposes the positive electrode satisfies $0.5 \leq Qc/Qa < 1$.

2. The lithium secondary battery of claim 1, wherein a ratio Wc/Wa between a weight Wc per unit area of the positive-electrode active material in the portion of the positive electrode that opposes the negative electrode and a weight Wa per unit area of the negative-electrode active material in the portion of the negative electrode that opposes the positive electrode is greater than 0.95 but less than 2.25.

3. The lithium secondary battery of claim 1, wherein the lithium-containing nickel complex oxide has a composition expressed as $Li_aNi_{1-(b+c)}Co_bM_cO_2$ (where $1.0 \leq a \leq 1.05$; $0.1 \leq b \leq 0.35$; $0.005 \leq c \leq 0.30$; and M is at least one kind selected from Al, Sr, and Ca).

4. The lithium secondary battery of claim 1, wherein,
the lithium secondary battery has a discharge end voltage of no less than 2.5 V and no more than 3.0 V; and
a discharge end potential of the positive electrode is no less than 2.7 V and no more than 3.4 V on a lithium metal basis.

5. The lithium secondary battery of claim 1, wherein,
the lithium secondary battery has a charge end voltage of no less than 4.2 V and no more than 4.3 V; and
the positive electrode has a charge end potential of no less than 4.3 V and no more than 4.4 V on a lithium metal basis.

6. The lithium secondary battery of claim 1, wherein the negative-electrode active material contains lithium titanate.

7. The lithium secondary battery of claim 6, wherein a ratio Wg/Wt of a weight Wt of lithium titanate to a weight Wg of the graphite material in the negative-electrode active material is no less than 3 and no more than 100.

8. The lithium secondary battery of claim 1, wherein the ratio Qc/Qa is greater than 0.75.

9. An electronic device comprising the lithium secondary battery of claim 1.

10. A vehicle comprising the lithium secondary battery of claim 1.

11. A battery pack comprising the lithium secondary battery of claim 1.

12. A battery module comprising the lithium secondary battery of claim 1.

* * * * *